(12) United States Patent
Kawamoto et al.

(10) Patent No.: US 11,995,580 B2
(45) Date of Patent: May 28, 2024

(54) DATA PROCESSING DEVICE AND DATA PROCESSING METHOD

(71) Applicant: SONY GROUP CORPORATION, Tokyo (JP)

(72) Inventors: Kenta Kawamoto, Tokyo (JP); Masahiro Fujita, Saitama (JP); Michael Siegfried Spranger, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 507 days.

(21) Appl. No.: 17/287,031

(22) PCT Filed: Oct. 24, 2019

(86) PCT No.: PCT/JP2019/041606
§ 371 (c)(1),
(2) Date: Apr. 20, 2021

(87) PCT Pub. No.: WO2020/095687
PCT Pub. Date: May 14, 2020

(65) Prior Publication Data
US 2021/0379766 A1    Dec. 9, 2021

(30) Foreign Application Priority Data

Nov. 5, 2018 (JP) .................. 2018-208192

(51) Int. Cl.
*G06F 17/00* (2019.01)
*A23L 5/10* (2016.01)
(Continued)

(52) U.S. Cl.
CPC ............ *G06Q 10/0631* (2013.01); *A23L 5/10* (2016.08); *A47J 36/321* (2018.08); *B25J 9/1661* (2013.01);
(Continued)

(58) Field of Classification Search
CPC .... G06Q 10/0631; G06Q 50/12; G06Q 10/06; A23L 5/10; A47J 36/321; B25J 9/1661;
(Continued)

(56) References Cited

U.S. PATENT DOCUMENTS 10,518,409 B2 * 12/2019 Oleynik ................. B25J 9/0087
11,707,837 B2 *  7/2023 Oleynik ............... B25J 15/0095
                                                                 700/250
(Continued)

FOREIGN PATENT DOCUMENTS

JP       2003058771 A     2/2003
JP       2005504259 A     2/2005
(Continued)

OTHER PUBLICATIONS

Robot 'chef' learns to recreate recipes from watching food videos | University of Cambridge (Year: 2023).*

(Continued)

*Primary Examiner* — Ronnie M Mancho
(74) *Attorney, Agent, or Firm* — Paratus Law Group, PLLC

(57) ABSTRACT

A data processing device includes a command generation unit configured to generate an instruction command for giving an instruction of one or more operations to be executed during a process by a robot provided with at least one arm, wherein the instruction command is generated on a basis of instruction data including image data obtained by capturing one or more images of situations during or after the process, and text data indicating at least one of an object to be utilized in the process or an operation to be executed during the process.

18 Claims, 34 Drawing Sheets

(51) Int. Cl.
*A47J 36/32* (2006.01)
*B25J 9/16* (2006.01)
*B25J 11/00* (2006.01)
*G06Q 10/0631* (2023.01)
*G06V 10/764* (2022.01)
*G06V 10/82* (2022.01)
*G06V 20/40* (2022.01)
*G06V 20/52* (2022.01)

(52) U.S. Cl.
CPC ........... *B25J 9/1664* (2013.01); *B25J 9/1697* (2013.01); *B25J 11/0045* (2013.01); *G06V 10/764* (2022.01); *G06V 10/82* (2022.01); *G06V 20/41* (2022.01); *G06V 20/52* (2022.01); *G06V 20/44* (2022.01)

(58) Field of Classification Search
CPC .... B25J 9/1664; B25J 9/1697; B25J 11/0045; G06V 10/764; G06V 10/82; G06V 20/41; G06V 20/52; G06V 20/44; A23P 30/00; G06F 18/24
USPC ........................................................ 701/245
See application file for complete search history.

(56) References Cited

U.S. PATENT DOCUMENTS

2016/0059412 A1\* 3/2016 Oleynik ................. B25J 19/02
                                                                    700/250
2022/0305648 A1\* 9/2022 Oleynik ..................... B25J 3/04

FOREIGN PATENT DOCUMENTS

| JP | 2008123131 A | 5/2008 | |
|----|---|---|---|
| JP | 2017-506169 A | 3/2017 | |
| JP | 2017536247 A | 12/2017 | |
| WO | WO 2017/197018 A2 | 11/2017 | |
| WO | WO 2018/165038 A1 | 9/2018 | |
| WO | WO-2021156647 A1 \* | 8/2021 | ............ A47J 36/321 |

OTHER PUBLICATIONS

Yezhou Yang et al:"Robot Learning Manipulation Action Plans by "Watching" Unconstrained Videos from the World Wide Web", Jan. 1, 2015(Jan. 1, 2015),XP055447280.

\* cited by examiner

FIG. 9
Steps
1. CUT TOMATO AND TEAR LETTUCE INTO BITE-SIZE PIECES BY HANDS. OPEN TIN OF TUNA.
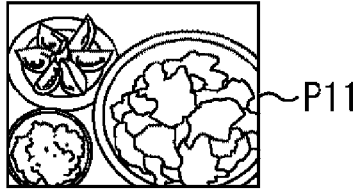
P11
2. SLICE CUCUMBER AND CUT ONION INTO RINGS. CUT BOILED EGG INTO BITE-SIZE PIECES.
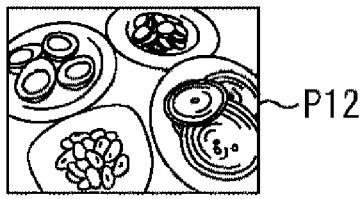
P12
3. PUT ALL INGREDIENTS ON PLATE AND DRESS SALAD.
P13
.
.
.

FIG. 11

"State"

<ID, parameter set>
<ID, Embedded vector>
<ID, parameter set, Embedded vector>

NICE-STYLE SALAD
- PLATE TYPE, NUMBER
- TOMATO, CUT, NUMBER=6, DIRECTION/ARRANGEMENT
- EGG, HALF-BOILED, HALF CUT, NUMBER=4, DIRECTION/ARRANGEMENT
- ...
- ...
- TOPPINGS
- DRESSING
- TEMPERATURE

FIG. 31 from_state_id: "whole tomato"
to_state_id: "1/8 tomato wedge"
⇒skill "cut by a knife"

other action:
"cut by scissors"
"cut by a slicer"
"tear by hands"
...
21

DATA PROCESSING DEVICE AND DATA PROCESSING METHOD

CROSS REFERENCE TO RELATED APPLICATIONS

This application is a National Stage Patent Application of PCT International Patent Application No. PCT/JP2019/041606 filed on Oct. 24, 2019 under 35 U.S.C. §371, which claims the benefit of Japanese Priority Patent Application JP 2018-208192 filed on Nov. 5, 2018, the entire contents of which are incorporated herein by reference.

TECHNICAL FIELD

The present technology relates to a data processing device and a data processing method, and more particularly to a data processing device and a data processing method for enabling control of a robot on the basis of instruction data including image data and text data.

BACKGROUND ART

There are services showing instruction data including recipes of dishes to the public. A user can search for a favorite recipe by searching for the recipe by a category or inputting a name of an ingredient as a keyword. In the recipe, various types of information such as a photograph of a completed dish, ingredients, and a cooking process are described.

The instructions provided by such a service are, of course, prepared for persons to view. Even in a case where only explanation of a rough procedure is described, persons can estimate a detailed procedure from past experiences and knowledge of other dishes, and the like and can cook.

By the way, with the development of artificial intelligence (AI) and sensing technologies, cooking robots that automatically perform cooking processes have drawn attention. Some cooking robots perform cooking processes using two arms in the same way as humans.

CITATION LIST

Patent Literature

[PTL 1]
JP 2017-506169A

SUMMARY OF INVENTION

Technical Problem

It would be convenient if a robot could be driven on the basis of instructions prepared for persons to view. There is no need for a person to prepare a program for driving an arm and the like as described in instruction data such as recipe data.

The present technology has been made in view of the foregoing, and enables control of a robot on the basis of instruction data including image data and text data.

Solution to Problem

A data processing device according to one aspect of the present technology includes a command generation unit configured to generate an instruction command for giving an instruction of one or more operations to be executed during a process by a robot provided with at least one arm, wherein the instruction command is generated on the basis of instruction data including image data obtained by capturing one or more images of situations during or after the process, and text data indicating at least one of an object to be utilized in the process or an operation to be executed during the process.

According to another aspect of the present technology, a data processing method includes generating, by a data processing device, an instruction command for giving an instruction of one or more operations to be executed by a robot provided with at least one arm, wherein the instruction command is generated on the basis of instruction data including image data obtained by capturing one or more images of situations during or after the process, and text data indicating at least one of an object to be utilized in the process or an operation executed during the process.

BRIEF DESCRIPTION OF DRAWINGS

FIG. 9 is a diagram illustrating an example of the recipe data.

FIG. 11 is a diagram illustrating an example of description of a state.

FIG. 12 is a diagram illustrating a specific example of description of a goal state.

FIG. 31 is a diagram illustrating an example of selection of action candidates.

DESCRIPTION OF EMBODIMENTS

Hereinafter, modes for carrying out the present technology will be described. Description will be given in the following order.

1. Control System of Cooking Robot
2. Planning and Action of State Sequence
3. Configurations and Operations of Devices
4. Modification «Control System of Cooking Robot»

<System Configuration>

Figure 1:
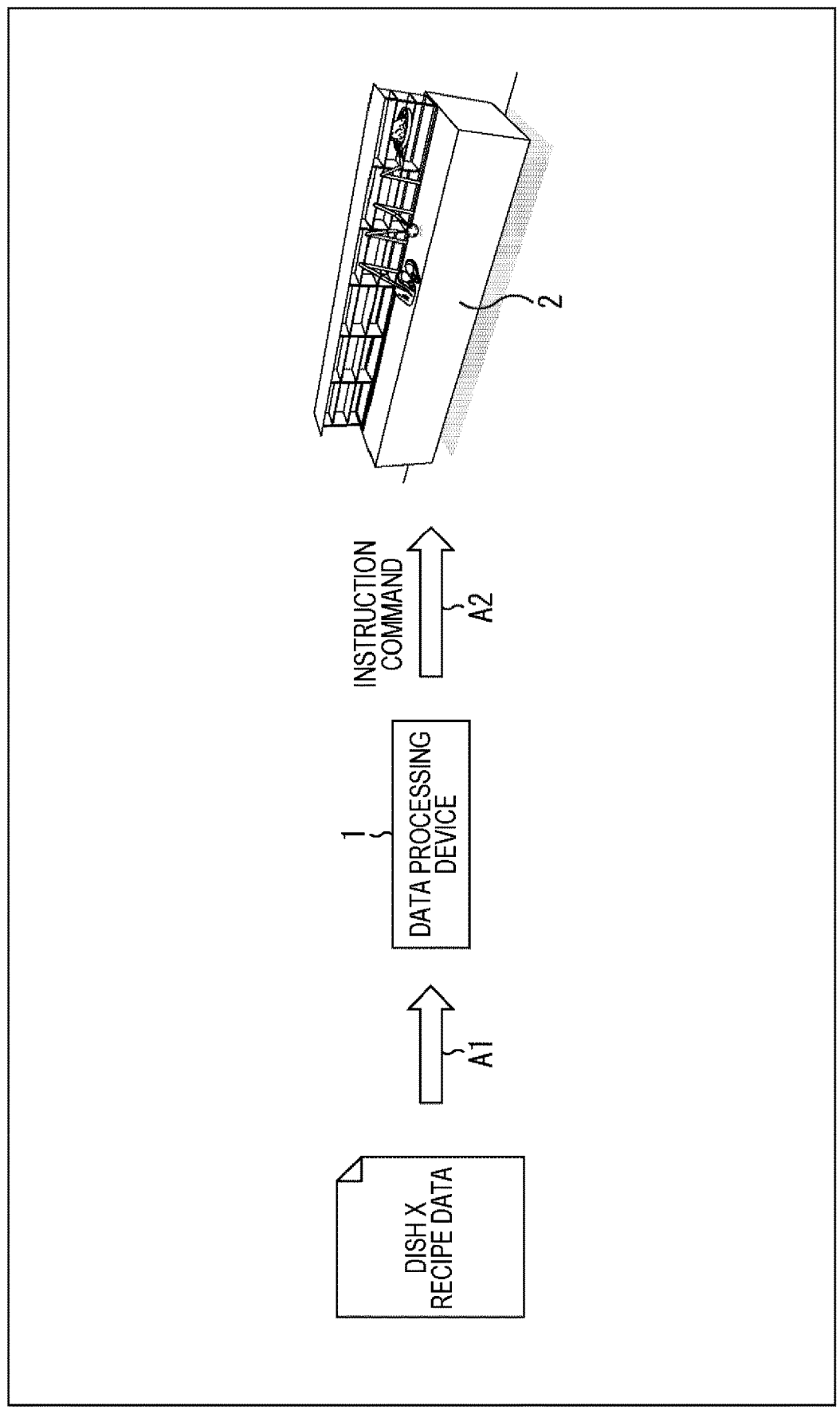
FIG. 1 is a diagram illustrating a configuration example of a control system according to an embodiment of the present technology.

FIG. 1 is a diagram illustrating a configuration example of a control system according to an embodiment of the present technology.

As illustrated in FIG. 1, the control system is configured by a data processing device 1 and a cooking robot 2. The cooking robot 2 is a robot including a drive system device such as a cooking arm and various sensors and having a cooking function. The cooking robot 2 is installed, for example, in a home.

The data processing device 1 is a device that controls the cooking robot 2. The data processing device 1 is configured by a computer or the like.

As illustrated in the left end in FIG. 1, the control of the cooking robot 2 by the data processing device 1 is performed on the basis of recipe data prepared for each dish. In the recipe data, a dish image that is an image obtained by capturing an image of a finished dish, a name of the dish, names of ingredients, a sentence explaining a cooking process, and the like are described. The recipe data is also used by a person to cook by viewing a recipe displayed by the recipe data.

Note that the dish means a work product finished after cooking. The cooking means a process of making the dish or an act of making the dish (work).

The data processing device 1 controls the cooking robot 2 on the basis of the recipe data, which is also used for cooking by a person, to make the dish.

As illustrated by the arrow A1, in a case where recipe data of a dish X is input, for example, the data processing device 1 performs planning until the dish X is completed on the basis of the description of the recipe data.

The planning is performed, for example, by setting a state transition from a start state to a goal state. A state of uncooked ingredients is set as the start state, and a state of a completed dish X is set as the goal state. The transition of the state occurs when the state of the ingredients changes due to an operation of the cooking robot 2, or the like.

The data processing device 1 generates an instruction command causing the cooking robot 2 to take an operation for causing a transition from a current state to a next state, and outputs the instruction command to the cooking robot 2 as illustrated by the arrow A2.

The cooking robot 2 drives each part such as the cooking arm according to the instruction command supplied from the data processing device 1 to perform an operation related to cooking. The instruction command includes torque of a motor provided in the cooking arm, a driving direction, information for controlling a driving amount, and the like.

Instruction commands are sequentially output from the data processing device 1 to the cooking robot 2 until the state reaches the goal state. The dish X is finally completed as the cooking robot 2 takes an operation according to the instruction command.

As described above, the data processing device 1 functions as a device that converts the recipe data, which can be said to be incomplete information for the cooking robot 2, into the instruction commands and controls the operation of the cooking robot 2. Since the recipe data is information prepared for a person to check the cooking process and the like, the recipe data can be said to be incomplete information as information for controlling the cooking robot 2.

Since the cooking robot 2 can be controlled on the basis of the recipe data for a person to cook, an administrator of the control system does not need to prepare a program for controlling the cooking robot 2 for each dish, for example.

The recipe data for a person to cook is abundantly present by being prepared as a service for showing recipes to the public. The user can cause the cooking robot 2 to make a selected dish out of many dishes. For example, the recipe data is acquired from a server providing the service for showing recipes to the public according to selection by the user, and is input to the data processing device 1.

Figure 2:
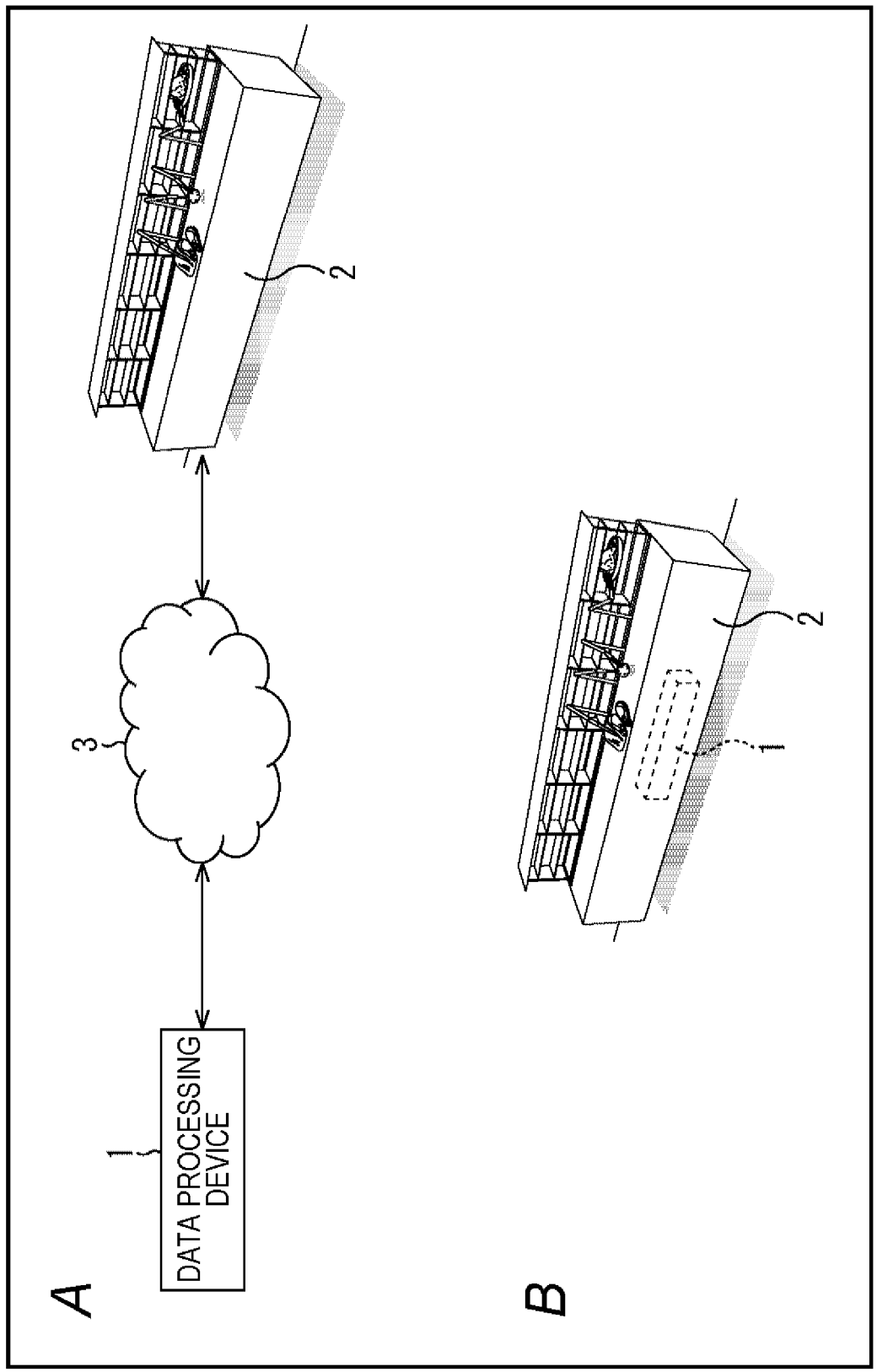
FIG. 2 is a diagram illustrating an arrangement example of a data processing device.

FIG. 2 is a diagram illustrating an arrangement example of the data processing device 1.

As illustrated in A in FIG. 2, the data processing device 1 is provided as, for example, a device outside the cooking robot 2. In the example in A in FIG. 2, the data processing device 1 and the cooking robot 2 are connected via a network 3 such as the Internet.

The instruction command transmitted from the data processing device 1 is received by the cooking robot 2 via the network 3. An image captured by a camera of the cooking robot 2, various data such as sensor data measured by the sensors provided in the cooking robot 2 are transmitted from the cooking robot 2 to the data processing device 1 via the network 3.

A plurality of cooking robots 2 may be connected to one data processing device 1, instead of one cooking robot 2 being connected to one data processing device 1.

As illustrated in B in FIG. 2, the data processing device 1 may be provided inside a housing of the cooking robot 2. In this case, the operation of each part of the cooking robot 2 is controlled in accordance with the instruction command generated by the data processing device 1.

Hereinafter, description will be given on the assumption that the data processing device 1 is provided as a device outside the cooking robot 2.

<Configuration of Cooking Robot>

Figure 3:
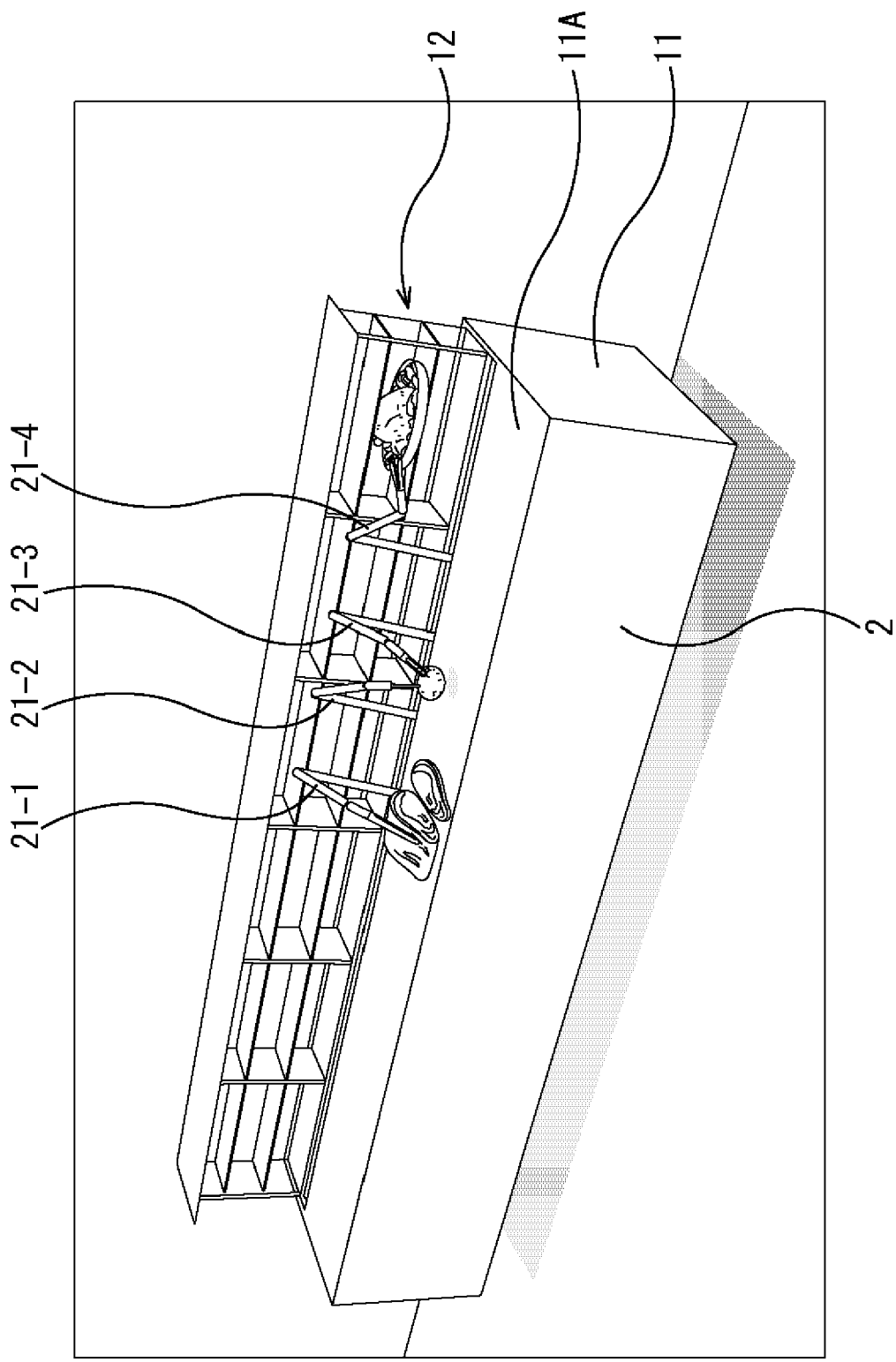
FIG. 3 is a perspective view illustrating an appearance of a cooking robot.

FIG. 3 is a perspective view illustrating an appearance of the cooking robot 2.

As illustrated in FIG. 3, the cooking robot 2 is a kitchen-type robot having an oblong rectangular parallelepiped housing 11. Various configurations are provided inside the housing 11 that is a main body of the cooking robot 2.

A cooking assistance system 12 is provided on a back side of the housing 11 so as to stand from an upper surface of the housing 11. Spaces formed in the cooking assistance system 12 by being divided by thin plate-like members have functions for assisting the cooking by cooking arms 21-1 to 21-4, such as a refrigerator, an oven range, and storage.

A rail is provided on a top plate 11A in a longitudinal direction, and the cooking arms 21-1 to 21-4 are provided on the rail. The cooking arms 21-1 to 21-4 can be changed in position along the rail as a moving mechanism.

The cooking arms 21-1 to 21-4 are robot arms configured by connecting cylindrical members with joint portions. Various operations related to cooking are performed by the cooking arms 21-1 to 21-4.

A space above the top plate 11A is a cooking space where the cooking arms 21-1 to 21-4 cook. The cooking space includes not only a space completely coinciding with the space where the cooking arms 21-1 to 21-4 cook but also a partial space included in such a space.

Although the four cooking arms are illustrated in FIG. 3, the number of cooking arms is not limited to four. Hereinafter, the cooking arms 21-1 to 21-4 will be collectively referred to as cooking arms 21 in a case where there is no need to distinguish the cooking arms 21-1 to 21-4.

Figure 4:
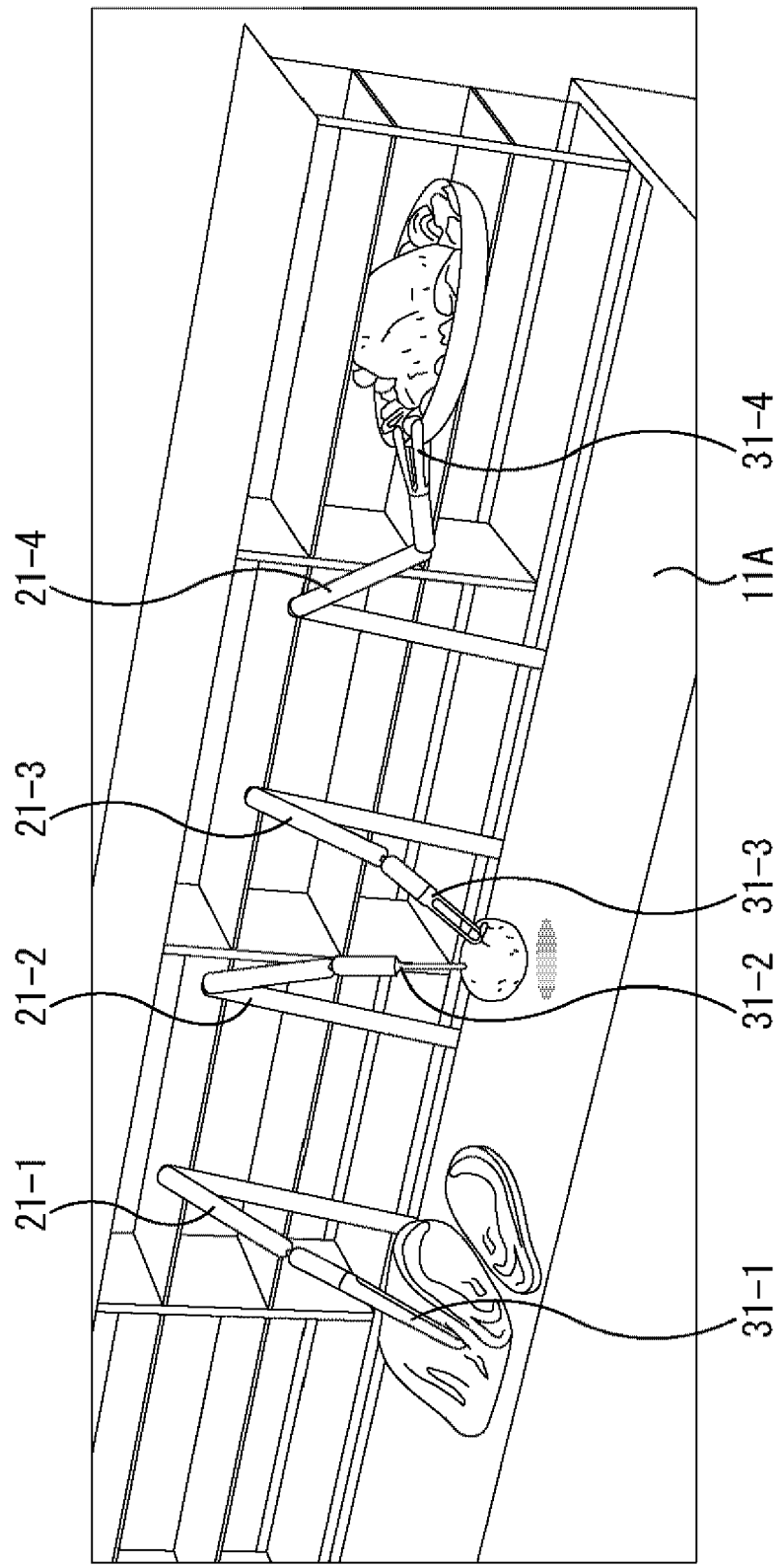
FIG. 4 is a view illustrating an enlarged situation of cooking arms.

FIG. 4 is a view illustrating an enlarged situation of cooking arms 21.

As illustrated in FIG. 4, attachments having various cooking functions are attached to distal ends of the cooking arms 21. As the attachments for the cooking arms 21, various attachments such as an attachment having a manipulator function (hand function) for gripping an ingredient, tableware, or the like, and an attachment having a knife function for cutting an ingredient are prepared.

In the example in FIG. 4, a knife attachment 31-1 that is an attachment having the knife function is attached to the cooking arm 21-1. A lump of meat placed on the top plate 11A is cut using the knife attachment 31-1.

A spindle attachment 31-2, which is an attachment used to fix an ingredient or rotate an ingredient, is attached to the cooking arm 21-2.

A peeler attachment 31-3, which is an attachment having a peeler function to peel off an ingredient, is attached to the cooking arm 21-3.

A potato lifted by the cooking arm 21-2 using the spindle attachment 31-2 is peeled off by the cooking arm 21-3 using the peeler attachment 31-3. As described above, the plurality of cooking arms 21 can perform one work in cooperation with one another.

A manipulator attachment 31-4, which is an attachment having a manipulator function, is attached to the cooking arm 21-4. A frying pan with chicken is carried using the manipulator attachment 31-4 to the space of the cooking assistance system 12 having an oven function.

Cooking by such cooking arms 21 proceeds by appropriately replacing the attachments according to the content of the work. The replacement of the attachment is automatically performed by the cooking robot 2, for example.

It is also possible to attach the same attachment to a plurality of cooking arms 21, such as attaching the manipulator attachment 31-4 to each of the four cooking arms 21.

The cooking by the cooking robot 2 is not only performed using the above attachments prepared as tools for the cooking arms but also appropriately performed using the same tool as a tool used by a person for cooking. For example, a knife used by a person is gripped by the manipulator attachment 31-4, and cooking such as cutting of an ingredient is performed using the knife.

<Configuration of Cooking Arm>

Figure 5:
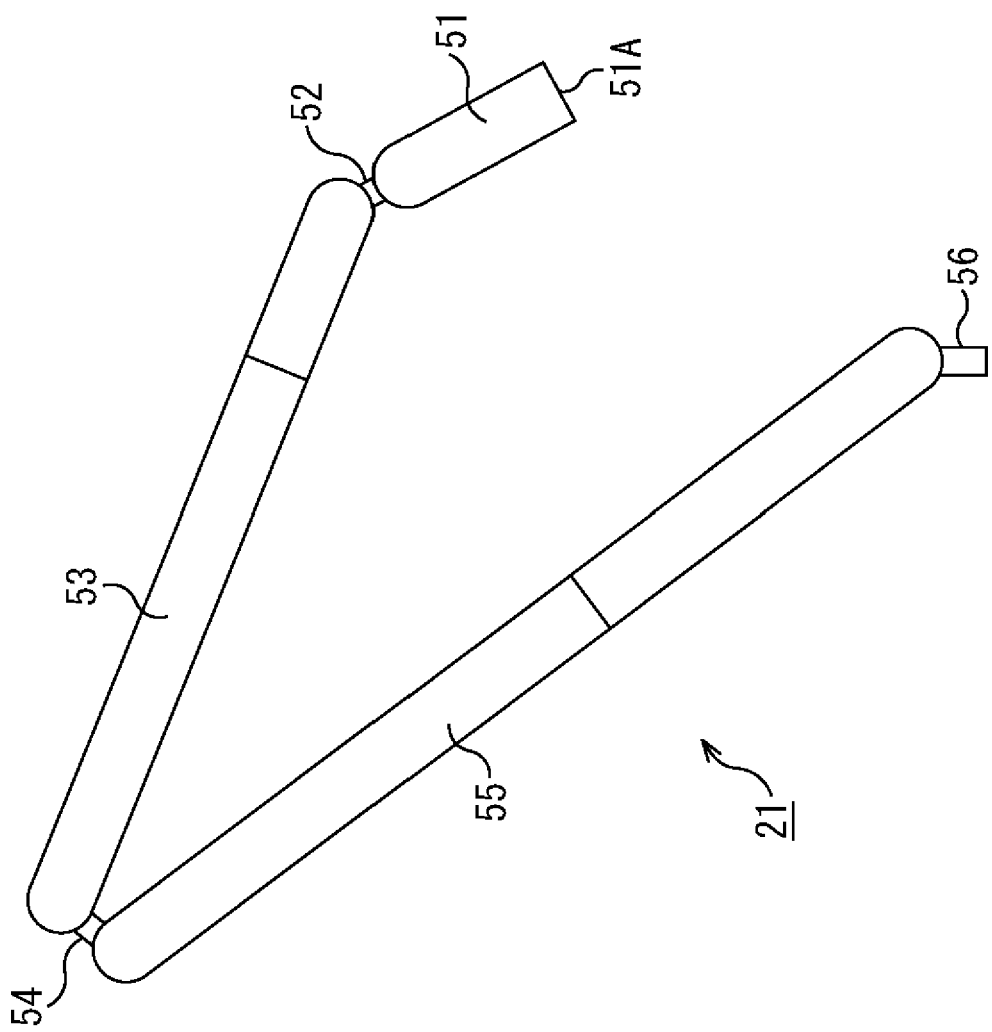
FIG. 5 is a view illustrating an appearance of a cooking arm.

FIG. 5 is a view illustrating an appearance of the cooking arm 21.

As illustrated in FIG. 5, the cooking arm 21 is generally configured by connecting thin cylindrical members with hinge portions serving as the joint portions. Each hinge portion is provided with a motor or the like that generates a force for driving each member.

As the cylindrical members, an attachment/detachment member 51, a relay member 53, and a base member 55 are provided in order from the distal end. The attachment/detachment member 51 is a member having a length of about ⅕ of the length of the relay member 53. The combined length of the length of the attachment/detachment member 51 and the length of the relay member 53 is substantially the same as the length of the base member 55.

The attachment/detachment member 51 and the relay member 53 are connected with a hinge portion 52, and the relay member 53 and the base member 55 are connected with a hinge portion 54. The hinge portion 52 and the hinge portion 54 are provided at both ends of the relay member 53.

In this example, the cooking arm 21 is configured by the three cylindrical members. However, the cooking arm 21 may be configured by four or more cylindrical members. In this case, a plurality of the relay members 53 is provided.

An attachment/detachment portion 51A where an attachment is attached or detached is provided at a distal end of the attachment/detachment member 51. The attachment/detachment member 51 includes the attachment/detachment portion 51A where various attachments are attached or detached, and functions as a cooking function arm unit that cooks by operating the attachment.

An attachment/detachment portion 56 to be mounted to the rail is provided at a rear end of the base member 55. The base member 55 functions as a moving function arm unit that realizes movement of the cooking arm 21.

Figure 6:
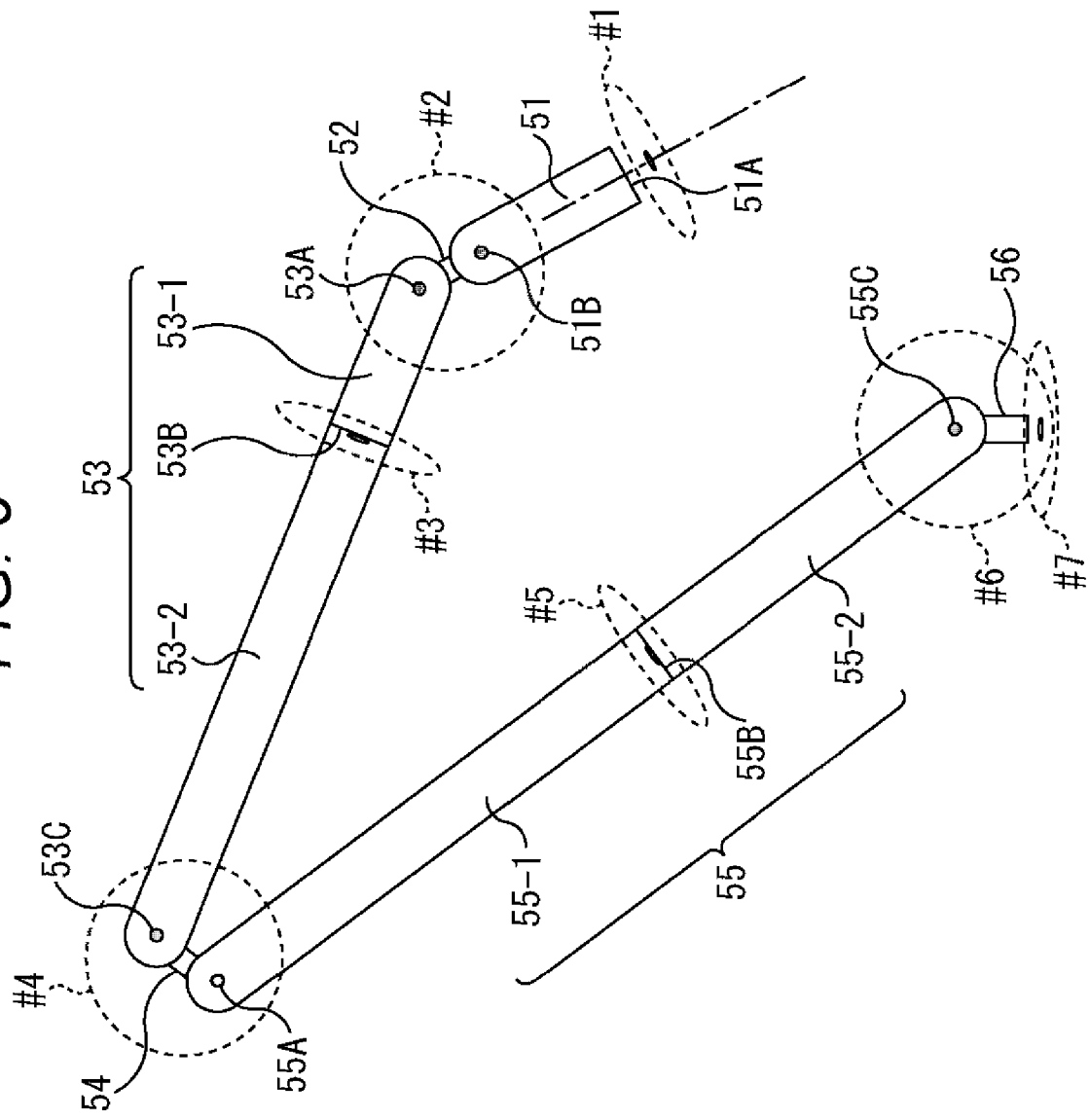
FIG. 6 is a view illustrating an example of movable ranges of respective parts of the cooking arm.

FIG. 6 is a view illustrating an example of movable ranges of respective parts of the cooking arm 21.

As illustrated by an ellipse #1, the attachment/detachment member 51 is rotatable about a central axis of a circular cross section. A flat small circle illustrated in the center of the ellipse #1 represents a direction of a rotation axis of an alternate long and short dash line.

As illustrated by a circle #2, the attachment/detachment member 51 is rotatable about an axis passing through a fitting portion 51B with the hinge portion 52. Furthermore, the relay member 53 is rotatable about an axis passing through a fitting portion 53A with the hinge portion 52.

Two small circles illustrated inside the circle #2 represent directions of respective rotation axes (in a direction perpendicular to the sheet surface). A movable range of the attachment/detachment member 51 centered on the axis passing through the fitting portion 51B and a movable range of the relay member 53 centered on the axis passing through the fitting portion 53A are, for example, a range of 90 degrees.

The relay member 53 is configured to be separated by a member 53-1 on a distal end side and a member 53-2 on a rear end side. As illustrated by an ellipse #3, the relay member 53 is rotatable about a central axis of a circular cross section at a connecting portion 53B between the member 53-1 and the member 53-2.

Other movable portions basically have a similar movable range.

In other words, as illustrated by a circle #4, the relay member 53 is rotatable about an axis passing through a fitting portion 53C with the hinge portion 54. Furthermore, the base member 55 is rotatable about an axis passing through a fitting portion 55A with the hinge portion 54.

The base member 55 is configured to be separated by a member 55-1 on a distal end side and a member 55-2 on a rear end side. As illustrated by an ellipse #5, the base member 55 is rotatable about a central axis of a circular cross section at a connecting portion 55B between the member 55-1 and the member 55-2.

As illustrated by a circle #6, the base member 55 is rotatable about an axis passing through a fitting portion 55C with the attachment/detachment portion 56.

As illustrated by an ellipse #7, the attachment/detachment portion 56 is mounted to the rail to become rotatable about a central axis of a circular cross section.

Thus, the attachment/detachment member 51 having the attachment/detachment portion 51A at the distal end, the relay member 53 connecting the attachment/detachment member 51 and the base member 55, and the base member 55, to the rear end of which the attachment/detachment portion 56 is connected, are respectively connected to be rotatable with the hinge portions. The movement of each movable portion is controlled by a controller in the cooking robot 2 according to the instruction command.

Figure 7:
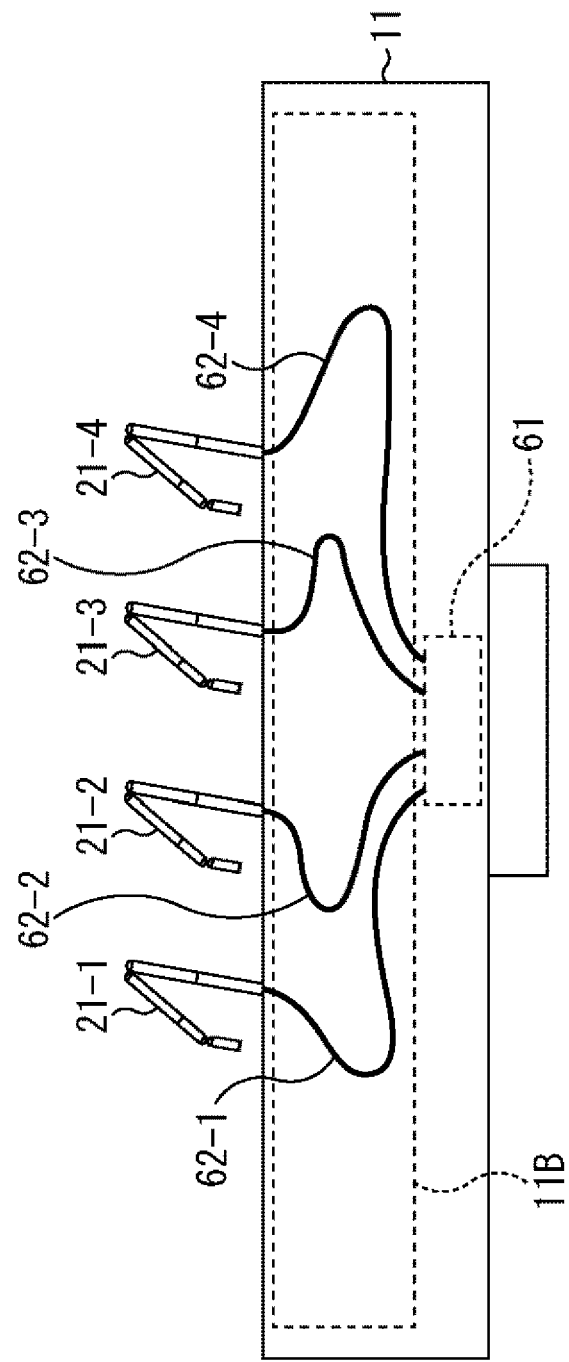
FIG. 7 is a view illustrating an example of connection between the cooking arms and a controller.

FIG. 7 is a view illustrating an example of connection between the cooking arms and the controller.

As illustrated in FIG. 7, the cooking arms 21 and a controller 61 are connected via a wire in a space 11B formed inside the housing 11. In the example in FIG. 7, the cooking arms 21-1 to 21-4 and the controller 61 are respectively connected via wires 62-1 to 62-4. The wires 62-1 to 62-4 having flexibility are appropriately bent depending on the positions of the cooking arms 21-1 to 21-4.

As described above, the cooking robot 2 is a robot capable of performing various works related to cooking by driving the cooking arms 21.

<Recipe Data>

Figure 8:
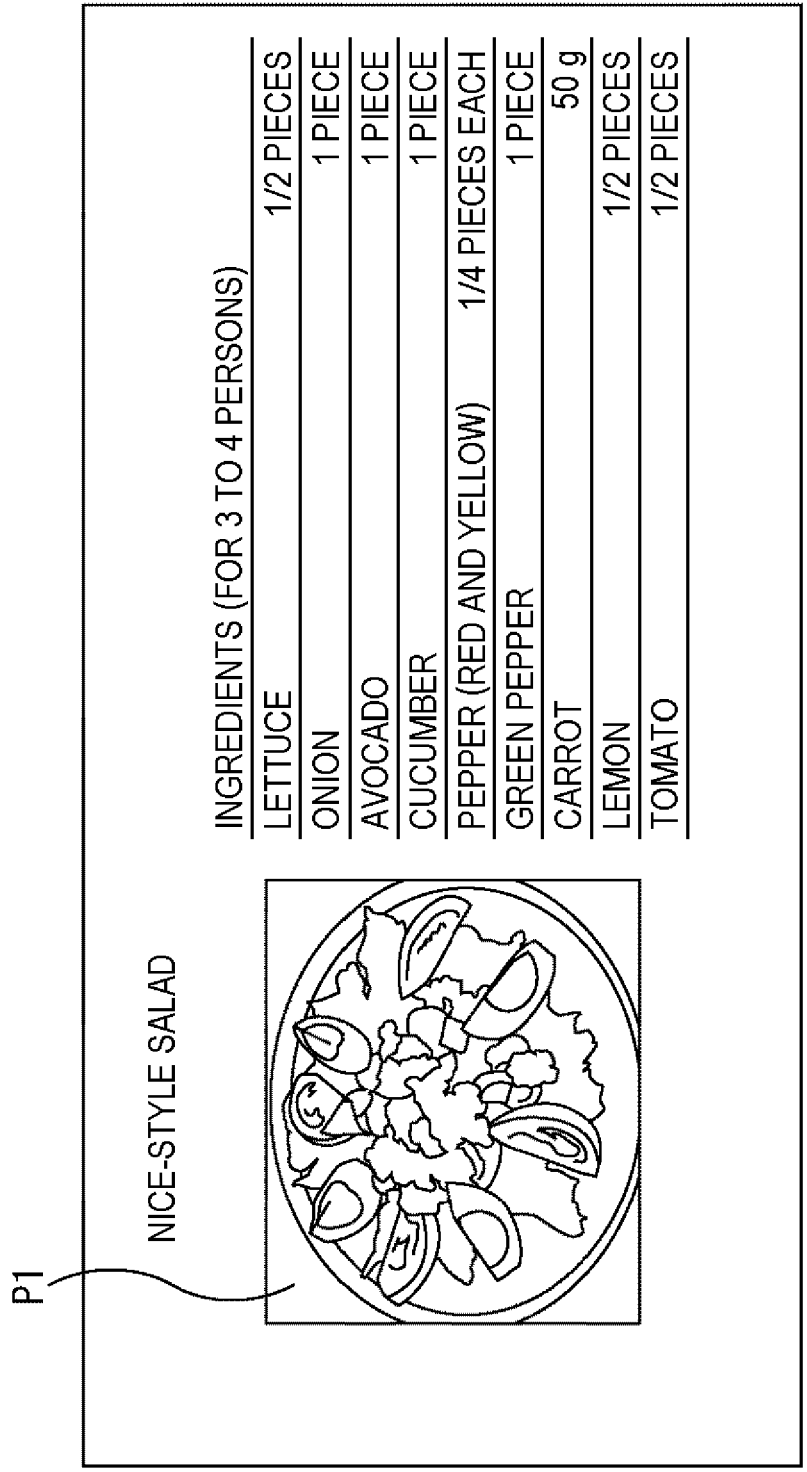
FIG. 8 is a diagram illustrating an example of recipe data.

FIGS. 8 and 9 are diagrams illustrating examples of the recipe data.

The recipe data in FIGS. 8 and 9 are recipe data of "Nice-style salad". As illustrated in FIG. 8, the recipe data of the "Nice-style salad" includes a dish image P1 that is a dish image obtained by capturing an image of a completed "Nice-style salad" and text data indicating ingredients.

In the example in FIG. 8, text data of "½ piece of lettuce, 1 piece of onion, 1 piece of avocado, and the like" is included as text data indicating ingredients for 3 to 4 persons. The text data of "Nice-style salad" indicating the name of the dish is also included in the recipe data of "Nice-style salad".

The recipe data generally includes text data as illustrated in FIG. 9 that explains a rough cooking process, together with an image obtained by capturing an image of a cooking situation.

In the example in FIG. 9, text data of "Cut tomato and tear lettuce into bite-size pieces by hand. Open a tin of tuna." is included together with an image P11, as information regarding first-step work. The image P11 is an image obtained by capturing an image of a situation after the first-step work.

Furthermore, text data of "Slice cucumber and cut onion into rings. Cut boiled egg into bite-size pieces" is included together with an image P12, as information regarding second-step work. The image P12 is an image obtained by capturing an image of a situation after the second-step work.

Text data of "Put all ingredients on a plate and dress the salad with your choice" is included together with an image P13, as information regarding third-step work. The image P13 is an image obtained by capturing an image of the completed "Nice-style salad" as a situation after the third-step work. The image P13 and the dish image P1 are the same image.

As described above, the recipe data used by the data processing device 1 to control the operation of the cooking robot 2 includes at least an image and text data. The image included in the recipe data may be a still image or a moving image.

The explanation of the cooking process in FIG. 9 may be or may not be included in the recipe data. In a case where the explanation of the cooking process in FIG. 9 is not included, the operation of the cooking robot 2 is controlled on the basis of the dish image P1 and the text data indicating the ingredients illustrated in FIG. 8.

Hereinafter, processing based on the recipe data of "Nice-style salad" and the like will be described. Processing based on recipe data of other dishes is also similarly performed.

«Planning and Action of State Sequence»

<Planning Based on Recipe Data>

Figure 10:
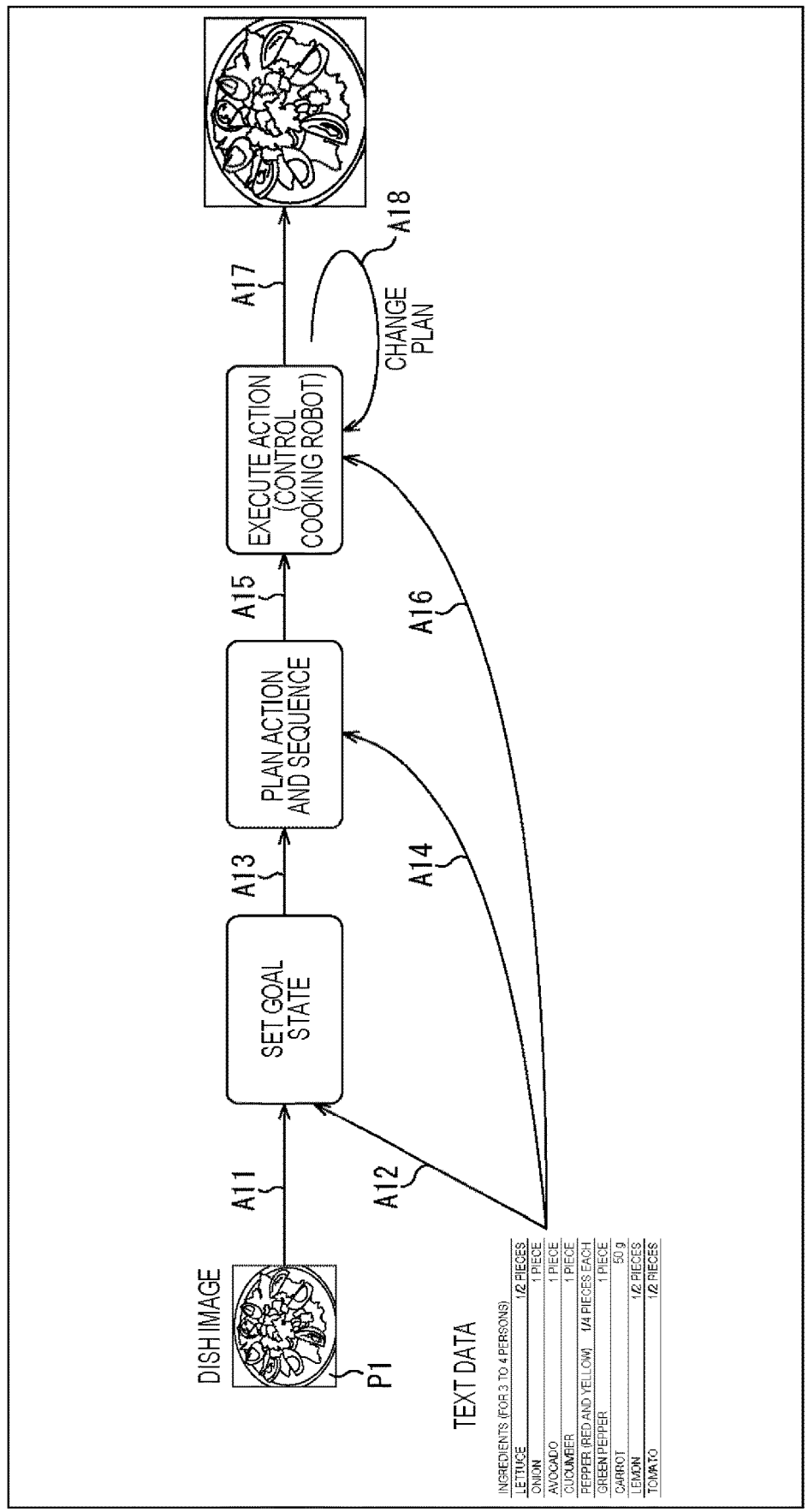
FIG. 10 is a diagram illustrating a flow of entire processing performed by the data processing device.

FIG. 10 is a diagram illustrating a flow of entire processing performed by the data processing device 1.

In a case where the recipe data of "Nice-style salad" is input, the data processing device 1 sets the goal state on the basis of the dish image and text data included in the recipe data, as illustrated by points of arrows A11 and A12.

For example, ingredients necessary for "Nice-style salad" are estimated on the basis of the text data. Furthermore, the state of each of the ingredients such as lettuce, onion, and avocado is estimated by analyzing the dish image P1 of "Nice-style salad". The state of each ingredient includes a state of cooking such as what kind of cooking is applied to the ingredient, and a state of arrangement such as how to serve the cooked ingredient. The state of "Nice-style salad" appearing in the dish image P1 is set as the goal state.

FIG. 11 is a diagram illustrating an example of description of the states including the goal state.

As illustrated in FIG. 11, each state set by the data processing device 1 is expressed as a discrete state by a combination of an ID that is an identifier of the state, and a parameter set.

Each state is appropriately expressed by a combination of an ID and vector data, or a combination of an ID, a parameter set, and vector data.

FIG. 12 is a diagram illustrating a specific example of description of the goal state.

A predetermined ID is assigned to a goal state $S_G$ that is the goal state of "Nice-style salad".

As illustrated in FIG. 12, the parameter set indicating the goal state $S_G$ includes parameters regarding tableware used for serving. The parameters regarding tableware include a parameter representing a type of the tableware and a parameter representing the number of pieces of tableware.

The type and the number of pieces of tableware are estimated by analyzing, for example, the dish image P1. For example, parameter representing "platter" as the type of tableware and "1" as the number of pieces of tableware are set.

The parameter set indicating the goal state $S_G$ includes parameters regarding tomato as an ingredient. The parameters regarding tomato include a parameter representing how to cut tomato, a parameter representing the number of pieces of tomato after cutting, and a parameter representing direction/arrangement of tomato after cutting.

The inclusion of tomato in the ingredients is estimated on the basis of, for example, the text data of the ingredients. How to cut tomato, the number of pieces of tomato after cutting, and the direction/arrangement of tomato after cutting are estimated on the basis of the text data explaining the cooking process or by analyzing the dish image P1. In the example in FIG. 12, a parameter representing that the number of pieces of tomato after cutting is "6" is set.

The parameter set indicating the goal state $S_G$ includes parameters regarding egg as an ingredient. The parameters regarding egg include a parameter representing a state of egg after cooking, a parameter representing how to cut egg, a parameter representing the number of pieces of egg after cutting, and a parameter representing direction/arrangement of egg after cutting.

The inclusion of egg in the ingredients is estimated on the basis of, for example, the text data of the ingredients. The state of egg after cooking, how to cut eggs the number of pieces of egg after cutting, and the direction/arrangement of egg after cutting are estimated on the basis of the text data explaining the cooking process or by analyzing the dish image Pl. In the example in FIG. 12, parameters representing that the state of egg after cooking is "half-boiled" and how to cut egg is "half cut" are set.

Similarly, the parameter set indicating the goal state $S_G$ includes parameters for topping, parameters for dressing, and parameters for temperature.

The goal state $S_G$ of "Nice-style salad" is represented by a set of such parameters estimated from the recipe data. Each state from the start state to the goal state is also configured by a combination of an ID and a parameter set.

Returning to the description of FIG. 10, after the goal state $S_G$ expressed by such description is set, planning of a state sequence from the start state to the goal state is performed as illustrated by a point of an arrow A13.

The planning of the state sequence is performed on the basis of the text data included in the recipe data, as illustrated by an arrow A14. For the planning of the state sequence, image data of the dish image P1 and the images included in the explanation of the cooking process may be used as appropriate.

In a case where the planning of the state sequence is completed, control of the cooking robot 2 is performed, as illustrated by a point of an arrow A15. The description of the recipe data is also used for the control of the cooking robot 2 as illustrated by an arrow A16 as appropriate.

Control for causing the cooking robot 2 to execute an action for causing a transition between states constituting the state sequence is repeated, and finally, as the state reaches the state of "Nice-style salad" set as the goal state $S_G$, as illustrated by a point of an arrow A17. Until the state reaches the goal state $S_G$, change of a transition sequence is performed as appropriate, as indicated by an arrow A18.

Figure 13:
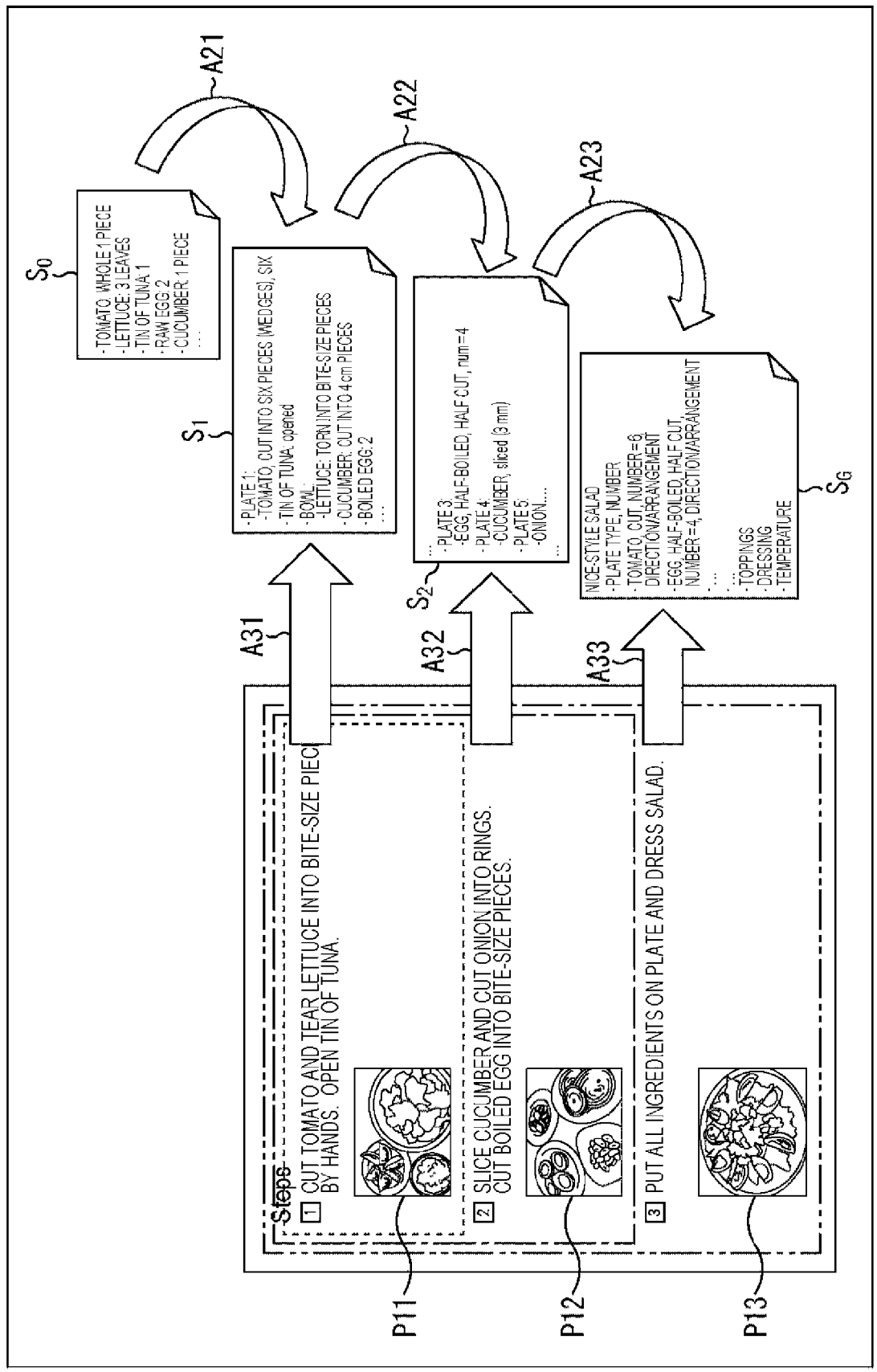
FIG. 13 is a diagram illustrating an example of planning of a state sequence.

FIG. 13 is a diagram illustrating an example of the planning of the state sequence from the start state to the goal state.

A state $S_0$ illustrated in the upper right is the start state. In the example in FIG. 13, the parameter set of the state $S_0$ is configured by a parameter representing "one whole" of "tomato", a parameter representing "three leaves" of "lettuce", a parameter representing "a tin" of "tuna", and the like.

The parameter set indicating the state $S_0$ is set on the basis of, for example, the text data of ingredients. Preparation of the ingredients may be performed on the basis of the text data of ingredients, and a state indicating prepared ingredients may be set as the start state.

A state $S_1$ illustrated at a point of an arrow A21 is a next state of the state $S_0$. The parameter set of the state $S_1$ is configured by a parameter representing a state in which "six pieces (wedge)" of "six" "tomatoes" are arranged in "plate 1", a parameter representing an opened "tin of tuna", and the like.

The parameter set indicating the state $S_1$ is set on the basis of, for example, the text data of ingredients and the information regarding the first-step work included in the explanation of the cooking process illustrated by an arrow A31. The cooking process illustrated on the left side in FIG. 13 is the same as the cooking process described with reference to FIG. 9.

As described above, the recipe data of "Nice-style salad" includes, as information regarding the first-step work, the text data of "Cut tomato and tear lettuce into bite-size pieces by hand. Open a tin of tuna." and the image P11 illustrating the situation after work.

By analyzing these pieces of information, how to cut tomato, how to keep the tin of tuna, and the like can be estimated, and the parameter set of the state $S_1$ can be set. For example, a situation in which six tomatoes obtained by cutting the tomato into six pieces are arranged on a small plate is captured in the image P11. Furthermore, a situation of the opened tin of tuna is captured in the image P11.

A state $S_2$ illustrated at a point of an arrow A22 is a next state of the state $S_1$. The parameter set of the state $S_2$ is configured by a parameter representing a state in which "four pieces" of "half-cut" "half-boiled" "egg" are arranged on "plate 3", a parameter representing a state in which "cucumber" sliced into a thickness of "3 mm" is arranged on "plate 4", and the like.

The parameter set indicating the state S2 is set on the basis of, for example, the text data of ingredients and the information regarding the first-step and second-step work included in the explanation of the cooking process illustrated by an arrow A32.

As described above, the recipe data of "Nice-style salad" includes, as information regarding the second-step work, the text data of "Slice cucumber and cut onion into rings. Cut boiled egg into bite-size pieces" and the image P12 illustrating the situation after work.

By analyzing these pieces of information, how to cut the cucumber, how to keep the egg, and the like can be estimated, and the parameter set of the state S2 can be set.

A next state of the state $S_2$ is the goal state $S_G$, as illustrated by the point of the arrow A23. The parameter set indicating the goal state $S_G$ is set on the basis of the dish image P1 of "Nice-style salad" and the text data of ingredients included in the recipe data, and all the information regarding the cooking process illustrated by an arrow A33.

As described above, the planning of the state sequence from the start state to the goal state is performed by, for example, translating the explanation of each step of the cooking process described in the recipe data into a state expression and connecting each state in order. With the state $S_0$ as the start state, the state can reach "Nice-style salad" as the goal state $S_G$ by state transition through the state $S_1$ and the state $S_2$.

Hereinafter, the entire state sequence from the start state to the goal state, which is set on the basis of the recipe data as appropriate, is referred to as an entire cooking sequence.

Figure 14:
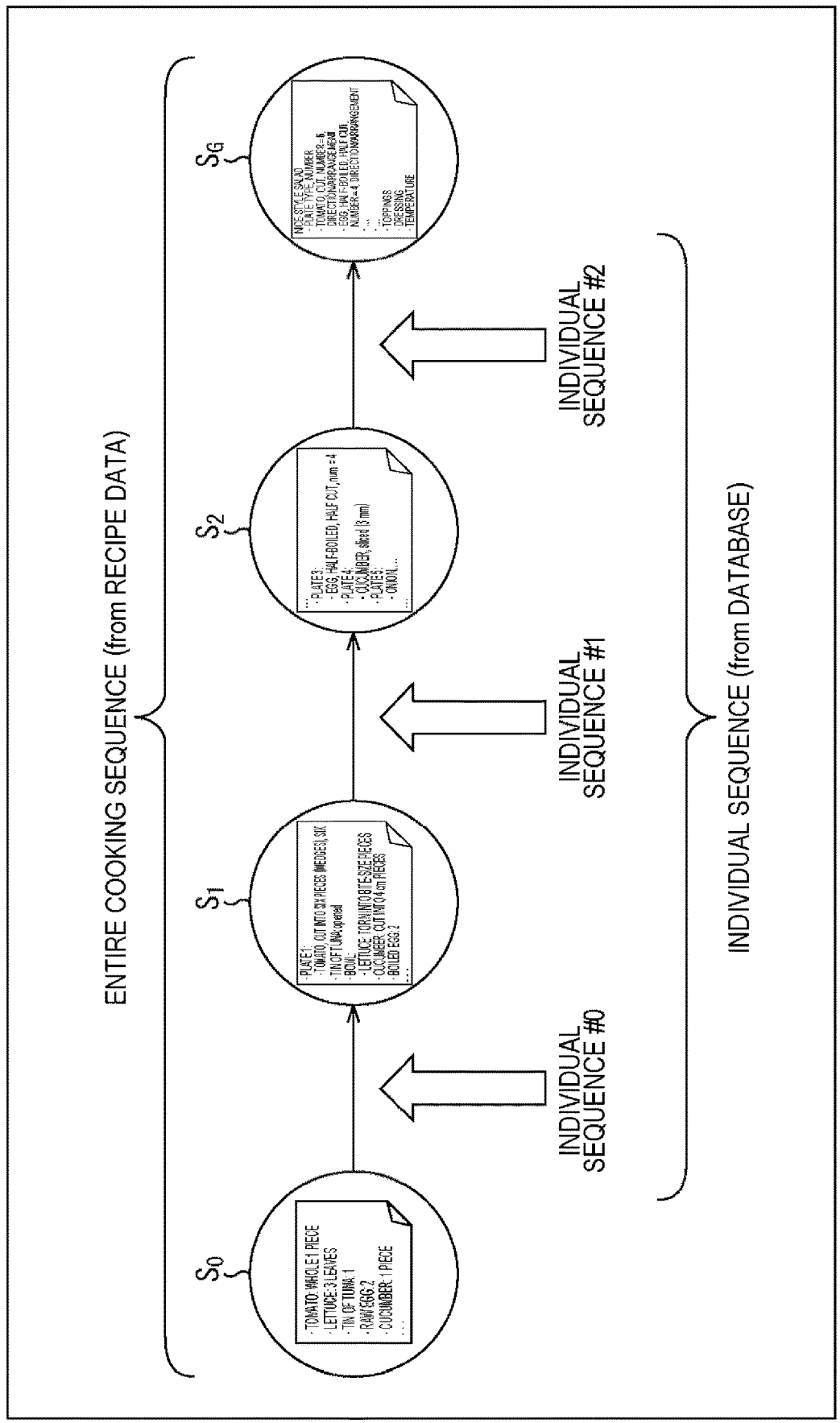
FIG. 14 is a diagram illustrating an example of an entire cooking sequence.

FIG. 14 is a diagram illustrating an example of the entire cooking sequence.

As illustrated in FIG. 14, the entire cooking sequence set on the recipe data of "Nice-style salad" is configured by the state $S_0$, the state $S_1$, the state $S_2$, the goal state $S_G$, and edges connecting the states.

The state transition corresponding to each edge is expressed by an individual sequence that is a state sequence connecting the state $S_0$, the state $S_1$, the state $S_2$, and the goal state $S_G$. To cause the state transition from one state to the next state constituting the entire cooking sequence, usually, states of a plurality of ingredients need to be changed. Cooking for changing the state of each ingredient is expressed by an individual sequence.

The respective individual sequences between the state $S_0$ and the state $S_1$, between the state $S_1$ and the state $S_2$, and between the state $S_2$ and the goal state $S_G$ are expressed by individual sequences #0 to #2, as illustrated by outlined arrows in FIG. 14. Each of the individual sequences #0 to #2 is also configured by the plurality of states and an edge connecting the states.

For example, in a case where the current state is the state $S_0$, the state reaches the state $S_1$ as the state transition is performed according to the individual sequence #0. Furthermore, in a case where the current state is the state $S_1$, the state reaches the state $S_2$ as the state transition is performed according to the individual sequence #1. In a case where the current state is the state $S_2$, the state reaches the goal state $S_G$ as the state transition is performed according to the individual sequence #2.

While the entire cooking sequence is set on the basis of the recipe data, the individual sequence is basically set on the basis of information prepared in a database (DB). For example, information regarding the individual sequences that are sequences for connecting the states configuring the entire cooking sequence is prepared in advance in the data processing device 1, for example.

Note that, in a case where the entire state sequence from the start state to the goal state can be thoroughly planned on the basis of only the recipe data, the individual sequence is not necessary.

Figure 15:
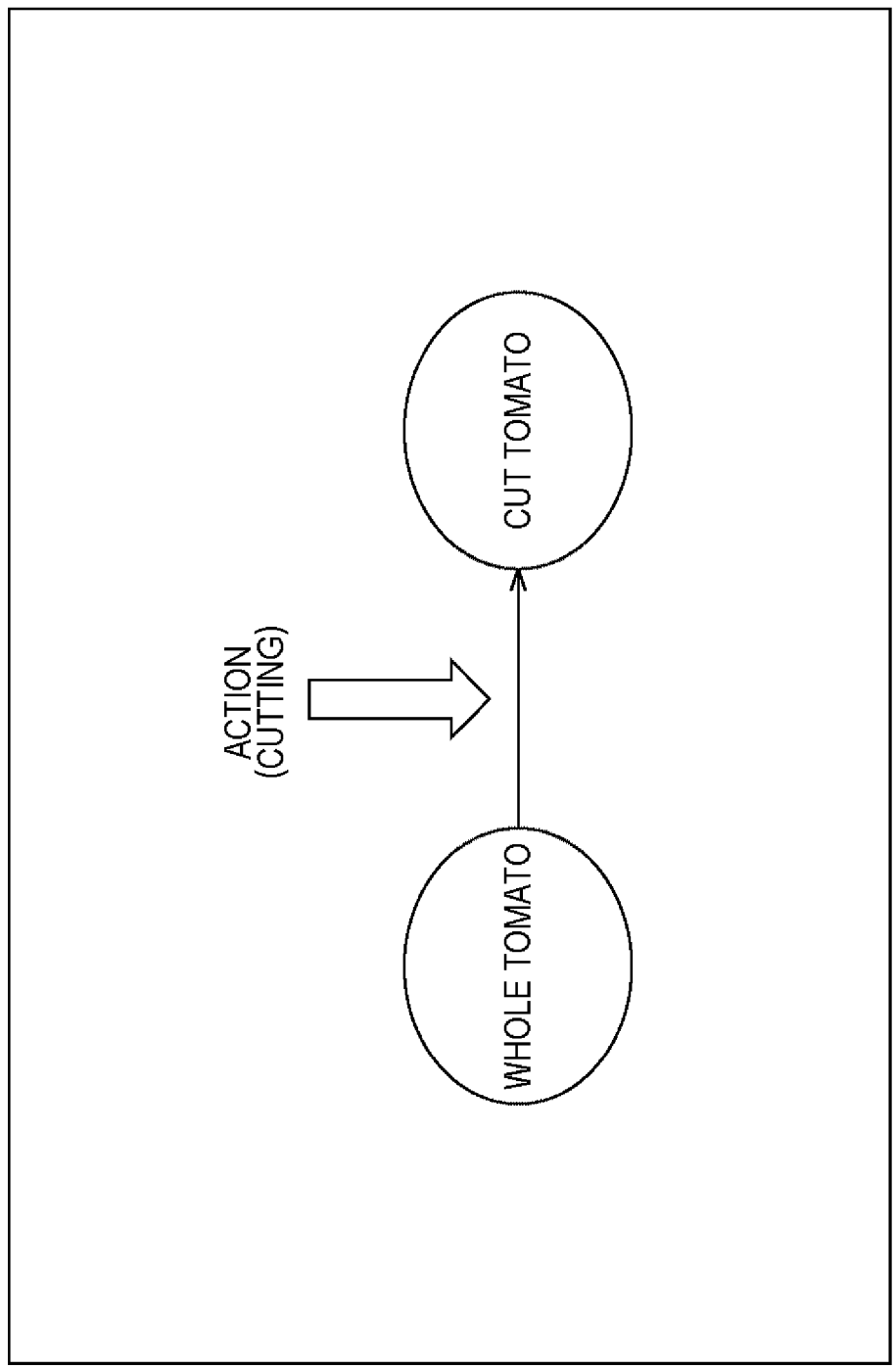
FIG. 15 is a diagram illustrating an example of a state transition.

FIG. 15 is a diagram illustrating an example of the state transition.

The transition between the states configuring the individual sequence is caused by an action of the cooking robot 2 as illustrated in FIG. 15. The action of the cooking robot 2 for causing the state transition is selected by reference to a database of the data processing device 1.

In the example in FIG. 15, "cut" is selected as an action for causing transition from a state of "whole tomato" that is a state before transition to a state of "cut tomato" that is a state after transition.

The database of the data processing device 1 stores information in which the two states of the state before transition and the state after transition are associated with the action for causing the transition between the two states. The database of the data processing device 1 will be described below.

Note that the action and the states illustrated in FIG. 15 are simplified for the convenience of the description. In practice, a more detailed action is selected, which specifies specifications such as a way of cutting and a way of putting force.

An individual sequence is configured by connecting a plurality of state transitions for one ingredient, as illustrated in FIG. 15, and such individual sequences connect the states constituting the entire cooking sequence.

<Examples of Databases>

Figure 16:
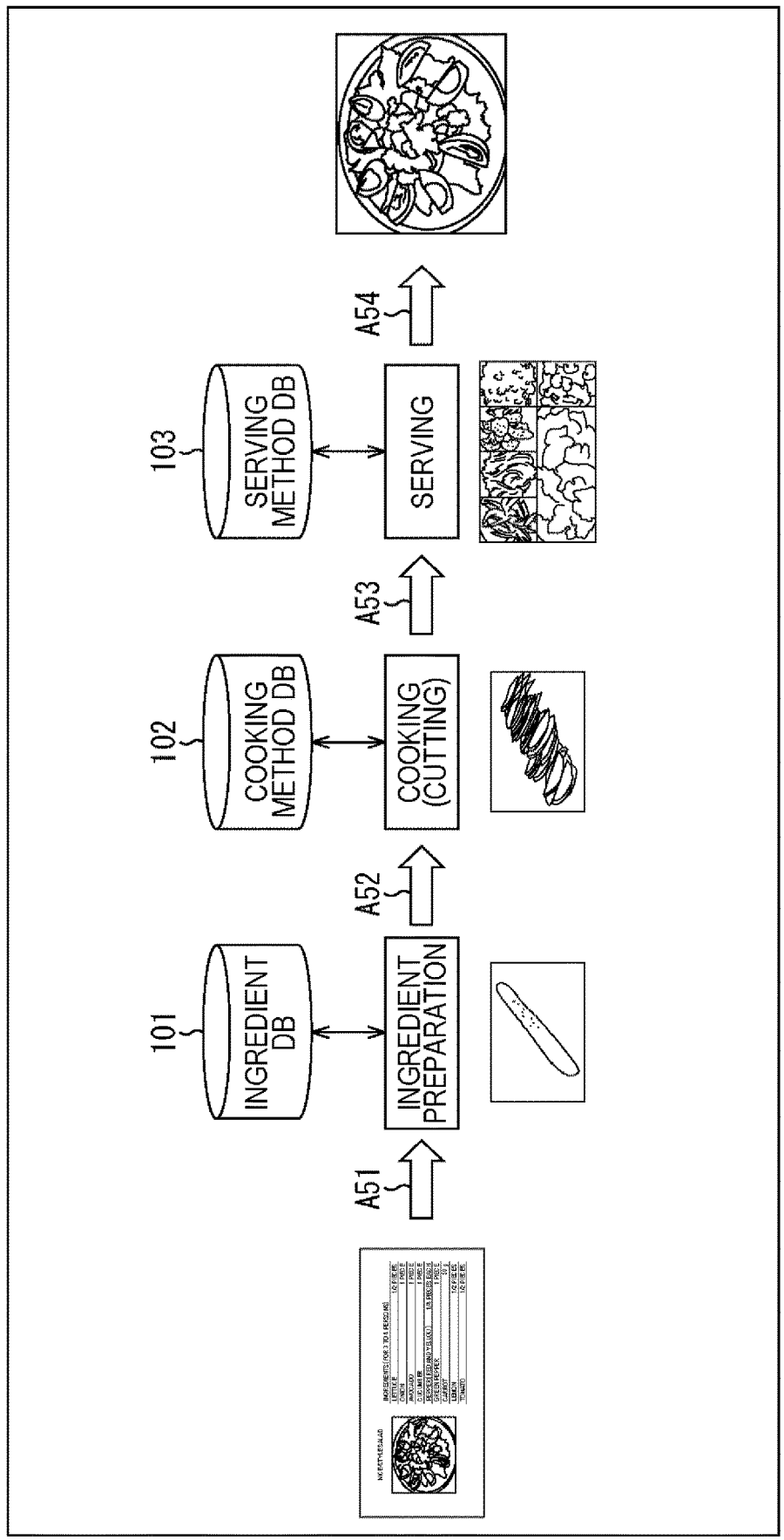
FIG. 16 is a diagram illustrating examples of databases.

FIG. 16 is a diagram illustrating examples of databases used to set individual sequences and execute actions.

As illustrated in FIG. 16, an ingredient DB 101, a cooking method DB 102, and a serving method DB 103 are prepared. Each database is provided in, for example, the data processing device 1.

Each database may be provided in either the data processing device 1 or the cooking robot 2, or each database may be provided in a server accessible from both the data processing device 1 and the cooking robot 2. The databases may be provided in different devices such as the ingredient DB 101 being provided in the cooking robot 2 and the cooking method DB 102 and the serving method DB 103 being provided in the data processing device 1.

Preparation of ingredients is performed on the basis of the recipe data, as illustrated by a point of an arrow A51. The preparation of ingredients is performed by reference to the ingredient DB 101.

The ingredient DB 101 is used to recognize a target ingredient, for example, in a case of performing an action for a predetermined ingredient. To perform an action of preparation of ingredients, information for ingredient recognition needs to be prepared. Details of the information stored in the database will be described below.

After the ingredients are prepared, cooking such as cutting for the ingredients is performed according to the state sequence, as illustrated by an arrow A52. The cooking for the ingredients is performed with reference to the cooking method DB 102 a plurality of times. The cooking method DB 102 is used in not only the case of performing an action regarding cooking of the ingredients but also a case of setting the above-described individual sequence.

After all the ingredients have been cooked, serving of the cooked ingredients is performed, as illustrated by an arrow A53. Serving of the cooked ingredients is performed with reference to the serving method DB 103 a plurality of times.

Ingredient DB 101

Figure 17:
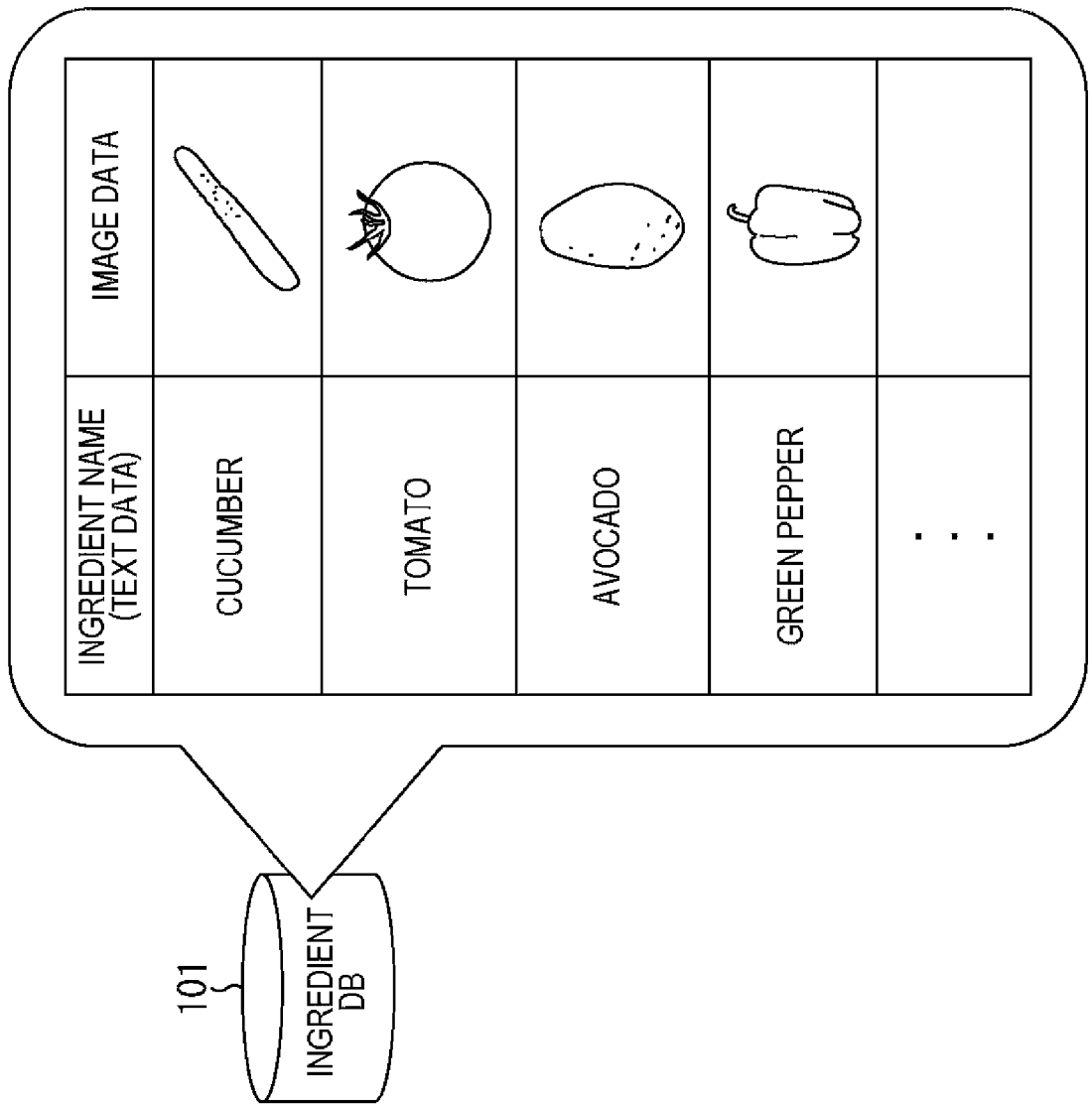
FIG. 17 is a diagram illustrating an example of information to be stored in an ingredient DB.

FIG. 17 is a diagram illustrating an example of information to be stored in the ingredient DB 101.

As illustrated in FIG. 17, the ingredient DB 101 stores image data of an appearance of an ingredient in association with an ingredient name.

In the example in FIG. 17, image data of ingredients of "cucumber", "tomato", "avocado", and "green pepper" are illustrated. As the image data of the ingredients, data indicating a characteristic of the ingredient extracted by analyzing an image obtained by capturing an image of the ingredient is prepared.

In FIG. 17, one image data is associated with one ingredient. However, in practice, a plurality of image data obtained by capturing an image of the ingredient different in size, shape, color, softness, orientation, and the like is associated with the one ingredient.

For example, the planning of the state sequence needs estimation of a current state such as what ingredients have been prepared. The information stored in the ingredient DB 101 is used at the time of estimation of the current state.

The data processing device 1 analyzes an image captured by the camera of the cooking robot 2 and extracts a characteristic of each ingredient around the cooking robot 2. The data processing device 1 matches the characteristic of the ingredient around the cooking robot 2 with the characteristic of each ingredient indicated by the information stored in the ingredient DB 101 to recognize the ingredient around the cooking robot 2, and estimates the current state.

The information stored in the ingredient DB 101 is also used at the time of executing an action. For example, in a case of preparing "cucumber", the data processing device 1 reads out the image data of "cucumber" by referring to the ingredient DB 101. The data processing device 1 includes the read image data to an instruction command and transmits the instruction command to the cooking robot 2.

The cooking robot 2 analyzes the image captured by the camera, and extracts the characteristic of each ingredient around the cooking robot 2. The cooking robot 2 matches the characteristic of the ingredient around the cooking robot 2 with the characteristic expressed by the image data of "cucumber" included in the instruction command and transmitted from the data processing device 1 to recognize the position and direction of "cucumber" around the cooking robot 2.

Thereby, the cooking robot 2 can grip the "cucumber" or move the "cucumber" to a predetermined position. Preparation of the other ingredients is similarly performed.

The information stored in the ingredient DB 101 is referred to not only at the time of preparing the ingredients but also at the time of executing various actions that need recognition of ingredients.

Cooking Method DB 102

Figure 18:
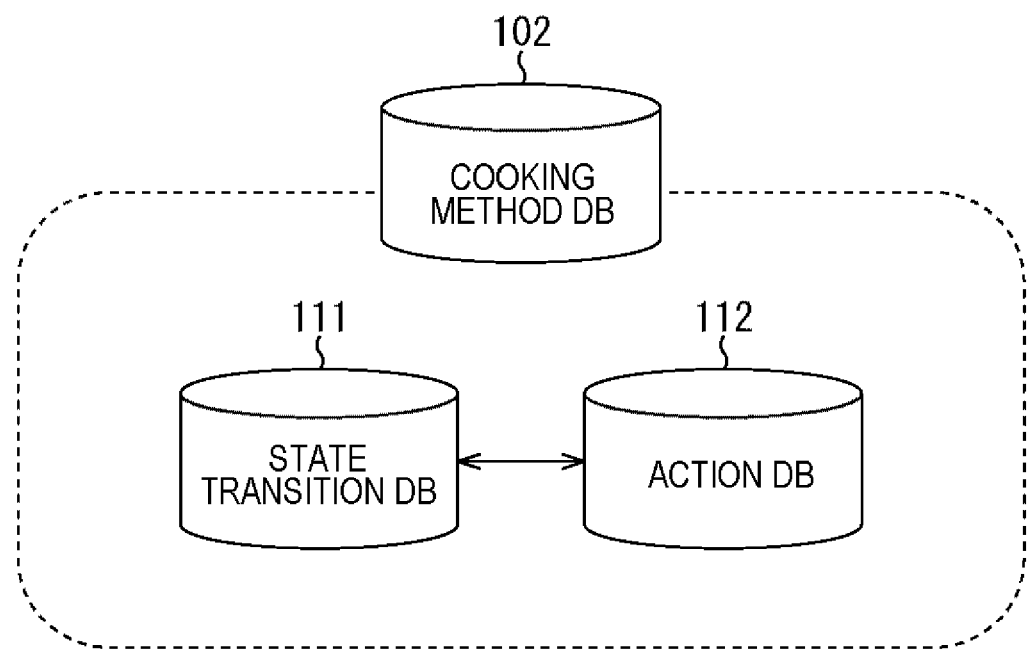
FIG. 18 is a diagram illustrating a configuration example of a cooking method DB.

FIG. 18 is a diagram illustrating a configuration example of the cooking method DB 102.

As illustrated in FIG. 18, the cooking method DB 102 includes a state transition DB 111 and an action DB 112.

The state transition DB 111 is a database storing information regarding a state transition from a state before cooking to a state after cooking. In the state transition DB 111, information regarding such a state transition is prepared according to a combination of various states such as, for example, each ingredient, each cooking method, or the like. The above-described individual sequence is set on the basis of the information stored in the state transition DB 111.

Meanwhile, the action DB 112 is a database storing information regarding a specification of an action for causing a state transition of an ingredient. An instruction command for executing an action regarding cooking of an ingredient is generated on the basis of the information stored in the action DB 112.

In the cooking method DB 102, the information regarding the state transitions of ingredients and the information regarding the specifications of actions for causing respective state transitions are managed in association with one another.

Figure 19:
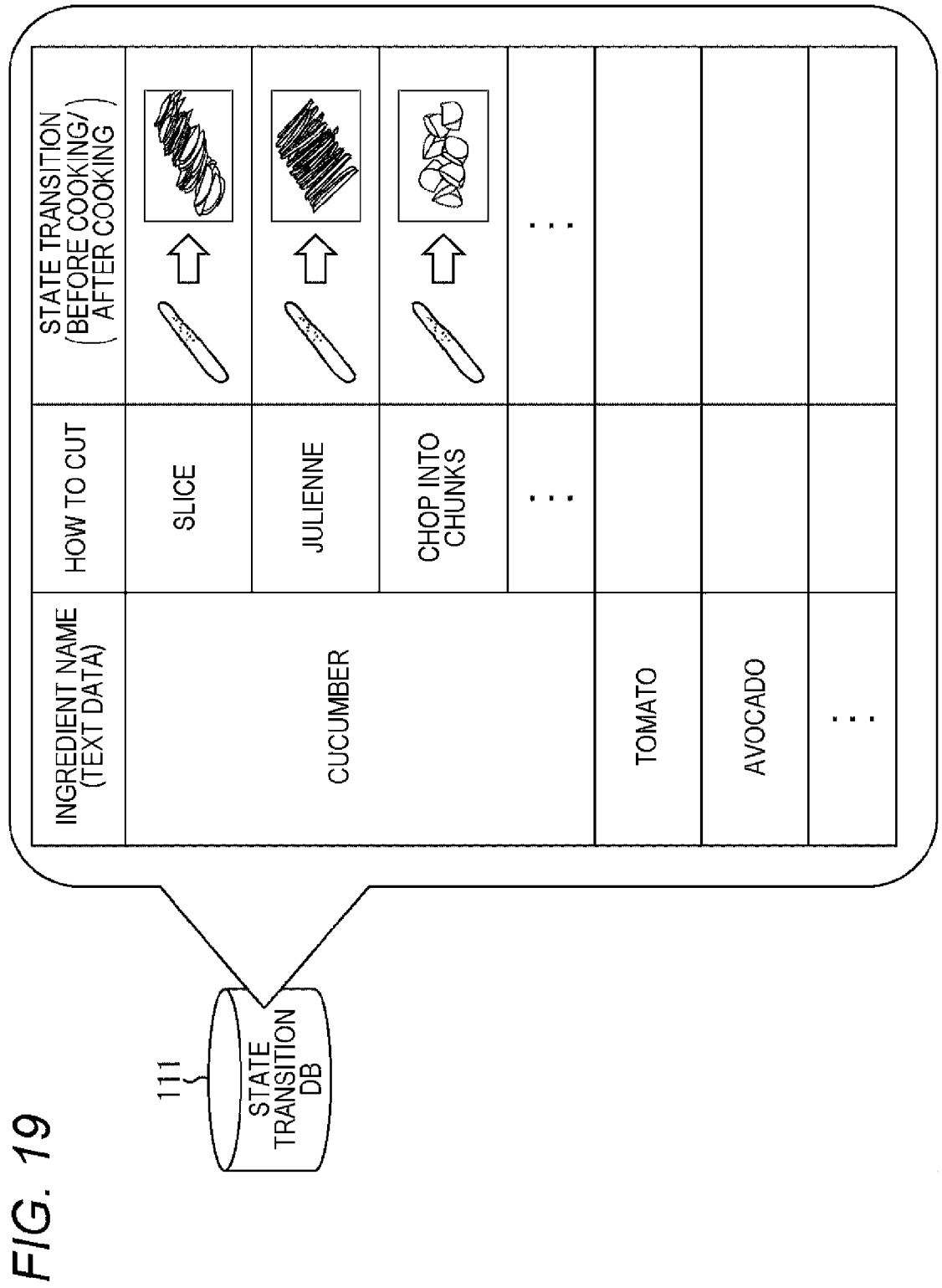
FIG. 19 is a diagram illustrating an example of information to be stored in a state transition DB.

FIG. 19 is a diagram illustrating an example of the information to be stored in the state transition DB 111.

As illustrated in FIG. 19, in the state transition DB 111, pieces of the information of the ingredient name, how to cook, and the state transition from the state before cooking to the state after cooking are stored in association with one another. Each state configuring the state transition is represented by, for example, the ID and the parameter set, as described above.

In the example in FIG. 19, a way of cutting (how to cut) and a state transition from a state before cutting to a state after cutting are associated with each of ingredients of "cucumber", "tomato", and "avocado". As the way of cutting "cucumber", "slice", "julienne", and "chop into chunks" are set.

For example, in a case of setting an individual sequence including a state in which "cucumber" is "sliced", the data processing device 1 acquires information regarding a state transition from a state before "slicing" to a state after "slicing" from the state transition DB 111. The data processing device 1 sets the individual sequence to include the state transition indicated by the acquired information.

The explanation of the cooking process of the recipe data may include description such as "slice cucumber, . . . " as described above. The individual sequence including a state where "cucumber" has been "sliced" may be set on the basis of such description.

With regard to the other ingredients, the information regarding the state transition for each how to cook is similarly stored in the state transition DB 111. In addition to the way of cutting, information of various types of how to cook such as ways of washing, peeling, boiling, and baking is stored.

As described above, in the state transition DB 111, the information regarding the state transitions from the state before cooking to the state after cooking, of the case where ingredients are cooked by various methods, is stored. The information stored in the state transition DB 111 is generated by expressing the state of the ingredient when cooked by various methods, using the parameter set as described above.

The generation of the information stored in the state transition DB 111 may be performed by a predetermined device by analyzing a moving image obtained by capturing an image of a situation during cooking, or may be manually performed by the administrator of the data processing device 1.

Figure 20:
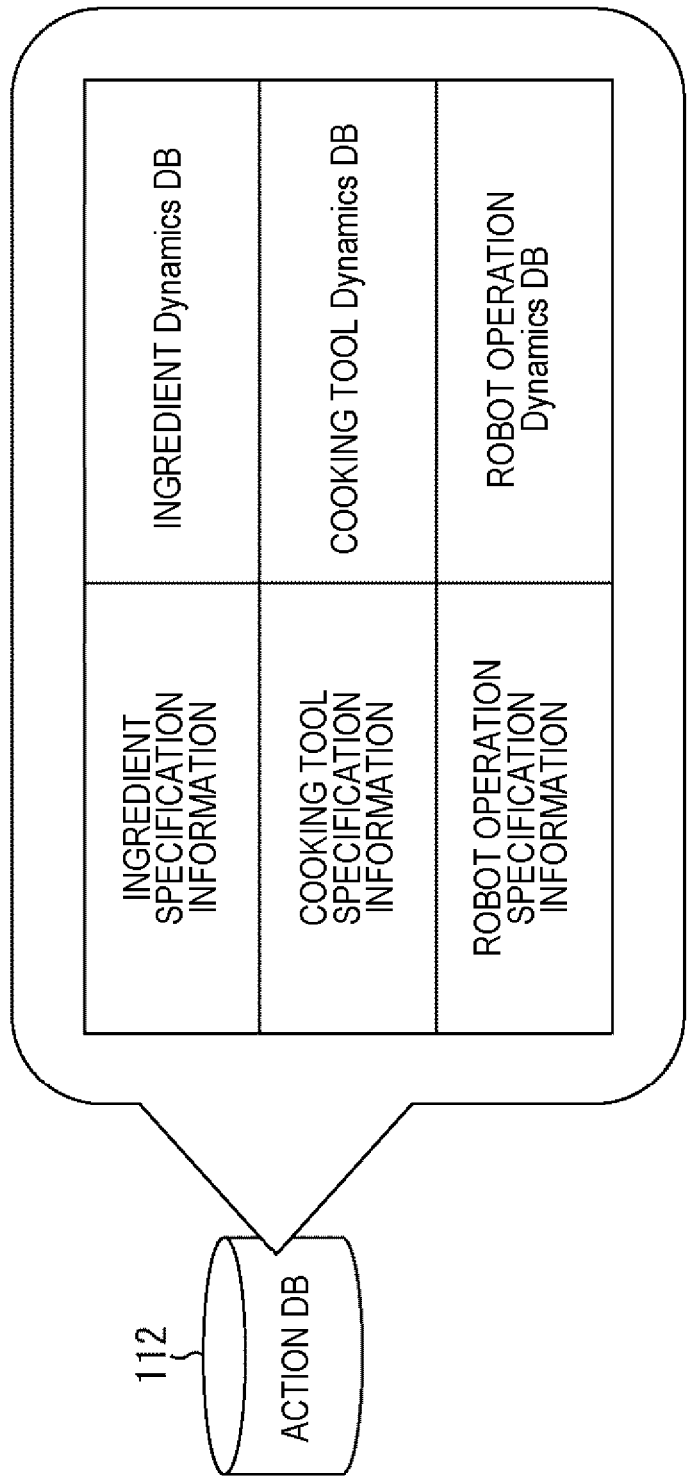
FIG. 20 is a diagram illustrating an example of information to be stored in an action DB.

FIG. 20 is a diagram illustrating an example of the information to be stored in the action DB 112.

As illustrated in FIG. 20, the action DB 112 is configured by an ingredient dynamics DB, which is a database of ingredient specification information, a cooking tool dynamics DB, which is a database of cooking tool specification information, and a robot operation dynamics DB, which is a database of robot operation specification information.

The ingredient specification information, the cooking tool specification information, and the robot operation specification information are stored in association with each action for causing a state transition indicated by the information stored in the state transition DB 111.

The ingredient specification information is information regarding a specification of an ingredient to be a target of an action. The ingredient specifications include various states of the ingredient, such as size, shape, and softness.

The ingredient specification information indicating the state of the ingredient at each time during execution of an action is stored in the ingredient dynamics DB, for example.

The cooking tool specification information is information regarding a specification of a tool (cooking tool) used for an action. The specification of a tool includes specifications, functions, and the like of various tools such as attachments used by the cooking robot 2 to cook. In a case where a state of a tool changes when performing an action, information indicating the change is included in the cooking tool specification information.

The cooking tool specification information in which a specification, a function, and the state of change, of a tool at each time during execution of an action, are associated with one another is stored in the cooking tool dynamics DB, for example.

The robot operation specification information is information regarding specifications of the operation of the cooking robot 2 when performing an action. The specifications of the operation of the cooking robot 2 include the position on the rail of the cooking arm 21 that executes the action, a speed, a rotation amount, and torque of each motor configuring the cooking arm 21, and the like. The specifications of the operation of the cooking robot 2 also include sensor data measured as feedback during the execution of the action.

Information expressing the position on the rail of the cooking arm 21, the speed, the rotation amount, and the torque of each motor configuring the cooking arm 21, and the sensor data serving as feedback, using vector expression, is prepared as the robot operation specification information.

In a case where an action is performed using hardware other than the cooking arm 21, information regarding a specification of an operation of the hardware is also prepared as the robot operation specification information.

The robot operation specification information indicating specifications of the operation of the cooking arm 21 at each time during execution of an action is stored in the robot operation dynamics DB, for example.

For example, at the time of executing an action using a predetermined tool, a driving amount of the motor configuring the cooking arm 21 that executes the action differ depending on the size of a target ingredient. The information regarding the operation of the cooking robot 2, of a case of cooking ingredients in various states using various tools, is stored in the action DB 112.

In other words, information indicating how to operate the cooking arm 21 using what function of what tool for what kind of ingredient in order to execute an action is stored in the action DB 112.

The information stored in the action DB 112 is generated by cooking ingredients in various states using various tools while the administrator of the data processing device 1 adjusts the operation of the cooking arm 21, for example.

Information generated by a predetermined device by analyzing a moving image obtained by capturing an image of a situation when cooking ingredients in various states using various tools may be stored in the action DB 112.

Each of the ingredient specification information, the cooking tool specification information, and the robot operation specification information may be generated by being estimated from the other information as appropriate.

For example, in a case of considering an action of dividing meat in a certain state into two by a knife, if the ingredient specification information and the cooking tool specification information are specified, approximate robot operation specification information can be estimated. Information thus estimated on the basis of the other information may be prepared in the action DB 112.

As described above, in the cooking method DB 102, the state transition DB 111 that is a data set in which an ingredient and a cooking method indicated by a state transition are associated is prepared. Furthermore, in the cooking method DB 102, the action DB 112 that is a data set of the specification of an ingredient, the specification of a tool used when performing cooking (action) according to a cooking method, and the specification of the operation of the cooking robot 2 is prepared in association with the cooking method.

Serving Method DB 103

Figure 21:
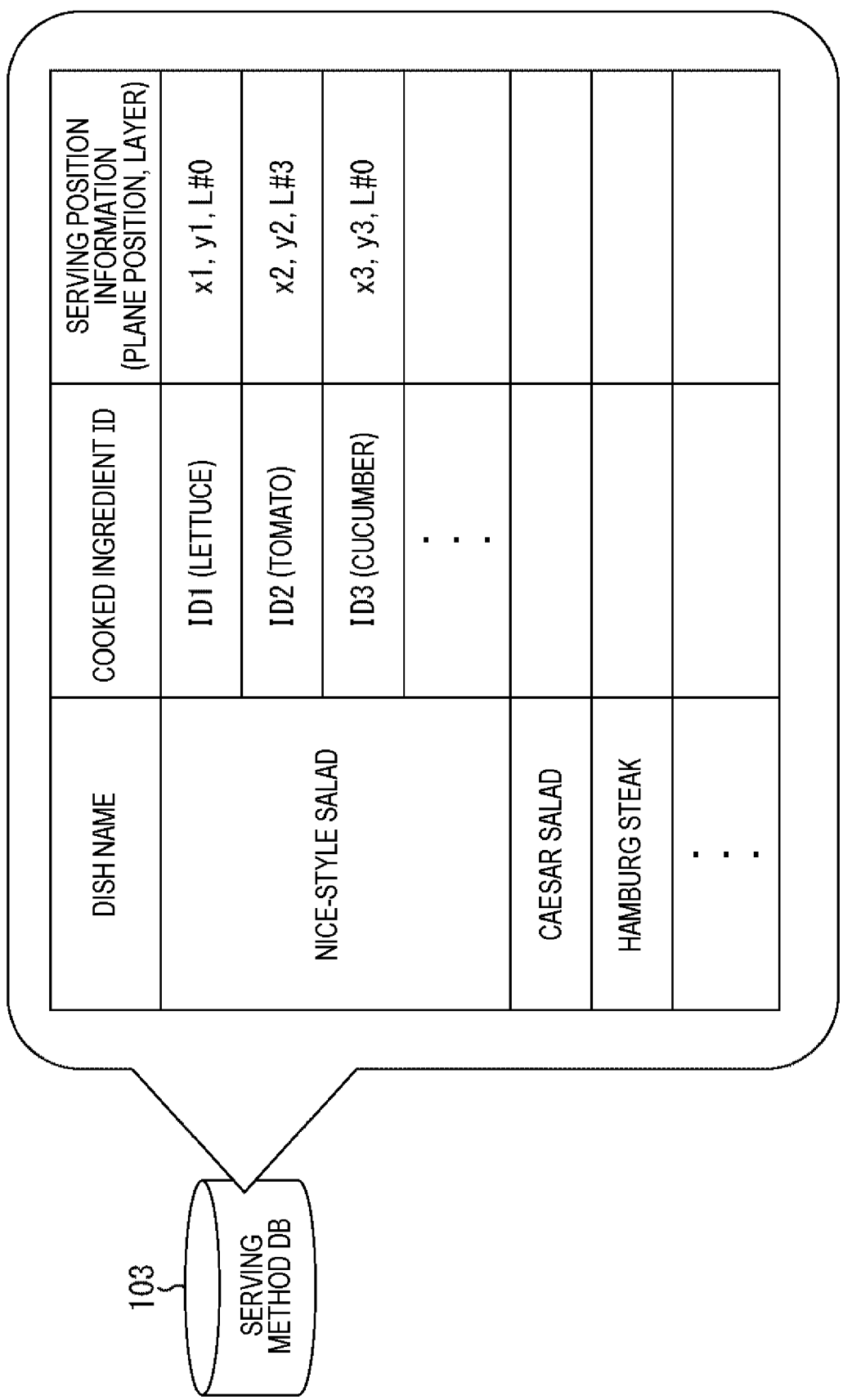
FIG. 21 is a diagram illustrating an example of information to be stored in a serving method DB.

FIG. 21 is a diagram illustrating an example of information to be stored in the serving method DB 103.

As illustrated in FIG. 21, in the serving method DB 103, an ingredient ID that is an identifier of a cooked ingredient necessary for completing a dish is stored in association with the dish.

Serving position information that is information regarding a serving position is set for the cooked ingredient. The position and layer (hierarchy) on a plane of each ingredient in tableware to be used for serving are indicated by the serving position information.

The example in FIG. 21 illustrates information regarding each of "Nice-style salad", "Caesar salad", and "Hamburg steak".

For "Nice-style salad", ID1 indicating cut lettuce, ID2 indicating cut tomato, and ID3 indicating cut cucumber are associated as identifiers of the cooked ingredients.

Furthermore, "x1, y1, L0" is set as information indicating the position of the cut lettuce. "x1, y1" indicates the position on the plane of the cut lettuce, and "L0" indicates that the cut lettuce is placed in a first layer which is a lowermost layer.

Furthermore, "x2, y2, L3" is set as information indicating the position of the cut tomato. "x2, y2" indicates the position on the plane of the cut tomato, and "L3" indicates that the cut tomato is placed in a fourth layer.

Information indicating a serving position is similarly set for other ingredients including the cut cucumber.

For example, in a case where cutting of "lettuce", "tomato", "cucumber", and the like necessary for "Nice-style salad" is finished, the data processing device 1 sets a state sequence regarding serving of the cooked ingredients. The data processing device 1 generates an instruction command for placing each ingredient at the position indicated by the serving position information according to the state sequence, and outputs the command to the cooking robot 2.

As described above, a data set indicating the necessary ingredients and the serving positions is stored for each dish in the serving method DB 103. The information stored in the serving method DB 103 is generated by analyzing the dish image included in the recipe data, for example.

An ingredient not captured in the image and its serving position are generated on the basis of information prepared in advance as knowledge for general serving methods as appropriate. The information stored in the serving method DB 103 may be manually set by the administrator of the data processing device 1.

The information indicating a combination of the position on the plane and the hierarchical position in the tableware has been prepared as the serving position information. However, information indicating only the position on the plane in the tableware or information indicating only the hierarchical position may be prepared as the serving position information.

Furthermore, information indicating a plane arrangement pattern in which ingredients are arranged in a predetermined pattern in the same hierarchy, or information indicating a hierarchy arrangement pattern in which ingredients are arranged in a predetermined pattern in different hierarchies may be prepared as the serving position information.

The information stored in each database may be appropriately changed according to the cooking robot 2 actually executing an action.

<Description Example of Action>

Although an operation of the cooking robot 2 is expressed by a state sequence, the operation of the cooking robot 2 may be expressed by a tree structure.

Figure 22:
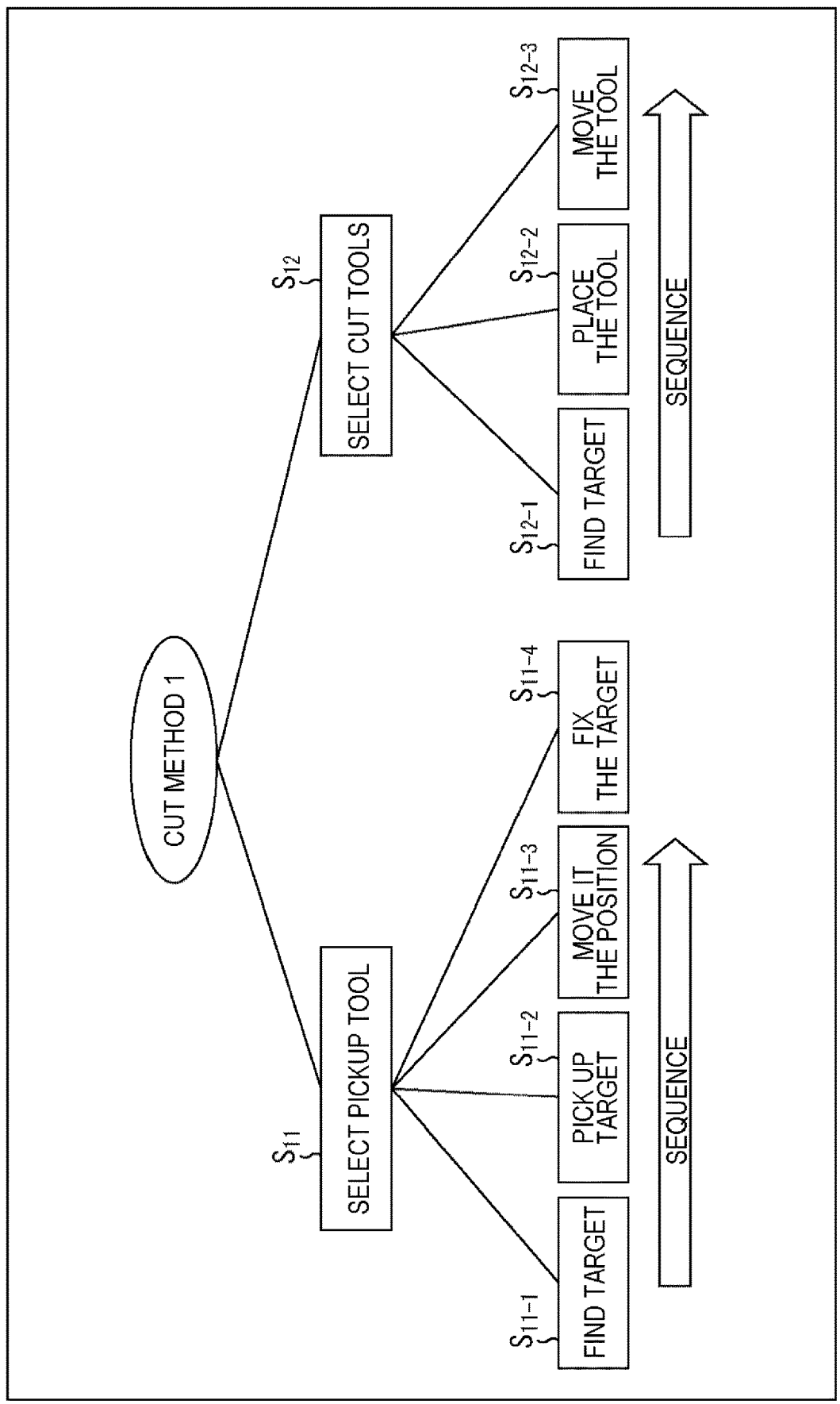
FIG. 22 is a diagram illustrating an expression example of an action.

FIG. 22 is a diagram illustrating an expression example of an action.

As illustrated in FIG. 22, one action may be expressed by a tree structure. Information regarding various actions expressed by a tree structure is prepared in a predetermined database of the data processing device 1. The tree structure illustrated in FIG. 22 illustrates "Cut Method 1" that is one action.

The "Cut Method 1" branches into "Select PickUp Tool" as a state $S_{11}$ and "Select Cut Tools" as a state $S_{12}$. The state $S_{11}$ is a state of the cooking arm 21-1 that executes the action of "Cut Method 1". Furthermore, the state $S_{12}$ is a state of the cooking arm 21-2 that executes the action of "Cut Method 1" in cooperation with the cooking arm 21-1.

The "Select PickUp Tool" is a state performed using the manipulator attachment that is a tool used to grip an ingredient, for example. Furthermore, the "Select Cut Tools" is a state performed using the knife attachment that is a tool used to cut an ingredient, for example.

Each state of the state $S_{11}$ and the state $S_{12}$ is configured by a sequence of a plurality of states serving as leaves.

In the example in FIG. 22, the state $S_{11}$ is configured by a sequence of "Find Target" as a state $S_{11-1}$, "Pick up Target" as a state $S_{11-2}$, "Move it The position" as a state $S_{11-3}$, and "Fix The target" as a state $S_{11-4}$.

The "Find Target" is a state of searching for a target ingredient, and the "Pick up Target" is a state of gripping an ingredient with the manipulator attachment. The "Move it The position" is a state of moving an ingredient to a predetermined position, and the "Fix The target" is a state of fixing an ingredient with the manipulator attachment.

Meanwhile, the state $S_{12}$ is configured by a sequence of "Find Target" as a state $S_{12-1}$, "Place The Tool" as a state $S_{12-2}$, and "Move The Tool" as a state $S_{12-3}$.

The "Find Target" is a state of searching for an ingredient to be a target for cutting, and the "Place The Tool" is a state of moving the knife attachment close to an ingredient. The "Move it The position" is a state of cutting an ingredient by moving the knife attachment close to the ingredient toward the ingredient.

Figure 23:
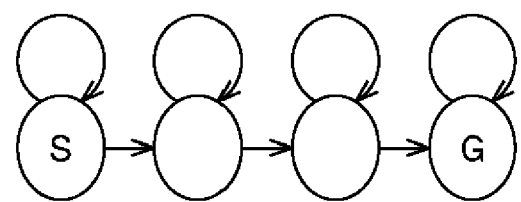
FIG. 23 is a diagram illustrating a state transition.

Each state serving as a leaf is represented by a state transition as illustrated in FIG. 23 from the start state to the goal state.

Figure 24:
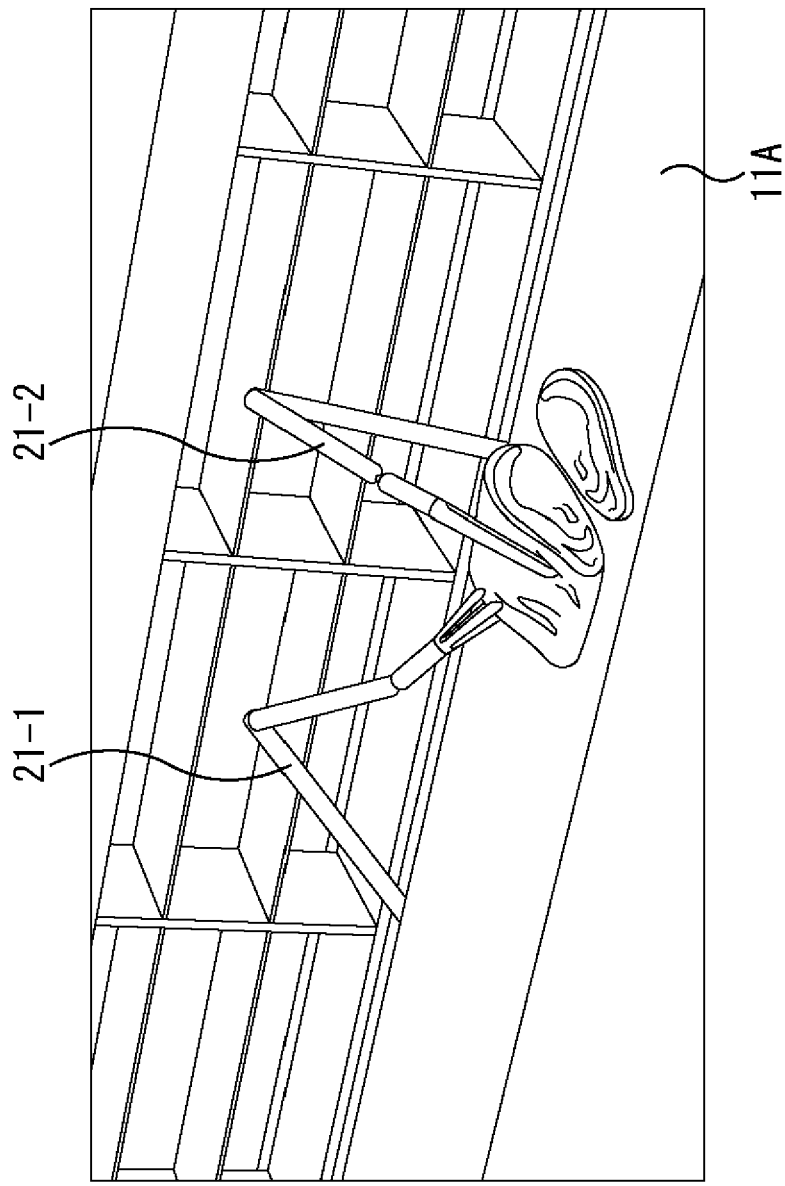
FIG. 24 is a diagram illustrating a situation of an action.

FIG. 24 is a diagram illustrating a situation of an action.

In the example in FIG. 24, a lump of meat as an ingredient is fixed by the cooking arm 21-1 to which the manipulator attachment is attached, and the meat is cut by the cooking arm 21-2 to which the knife attachment is attached.

The operation of the cooking arm 21-1 for fixing the lump of meat by the manipulator attachment is realized by executing the "Select PickUp Tool" according to the description in FIG. 22. Furthermore, the operation of the cooking arm 21-2 for cutting the meat by the knife attachment is realized by executing the "Select Cut Tools" according to the description in FIG. 22.

The action of the cooking robot 2 may be controlled by combining actions expressed by the tree structure as described above.

An action having an expression of a tree structure may be selected according to a state before transition and a state after transition, and may be set as an edge between the states constituting an individual sequence. In this case, the operation of the cooking robot 2 is controlled using a combination of the state sequence and the action having an expression of a tree structure.

As described above, control of the cooking robot 2 is performed using a state transition or a tree structure. Control of the cooking robot 2 may be performed using a neural network (NN) such as deep neural network (DNN) or recurrent neural network (RNN).

«Configurations and Operations of Devices»

<Configurations of Devices>

Configuration of Data Processing Device 1

Figure 25:
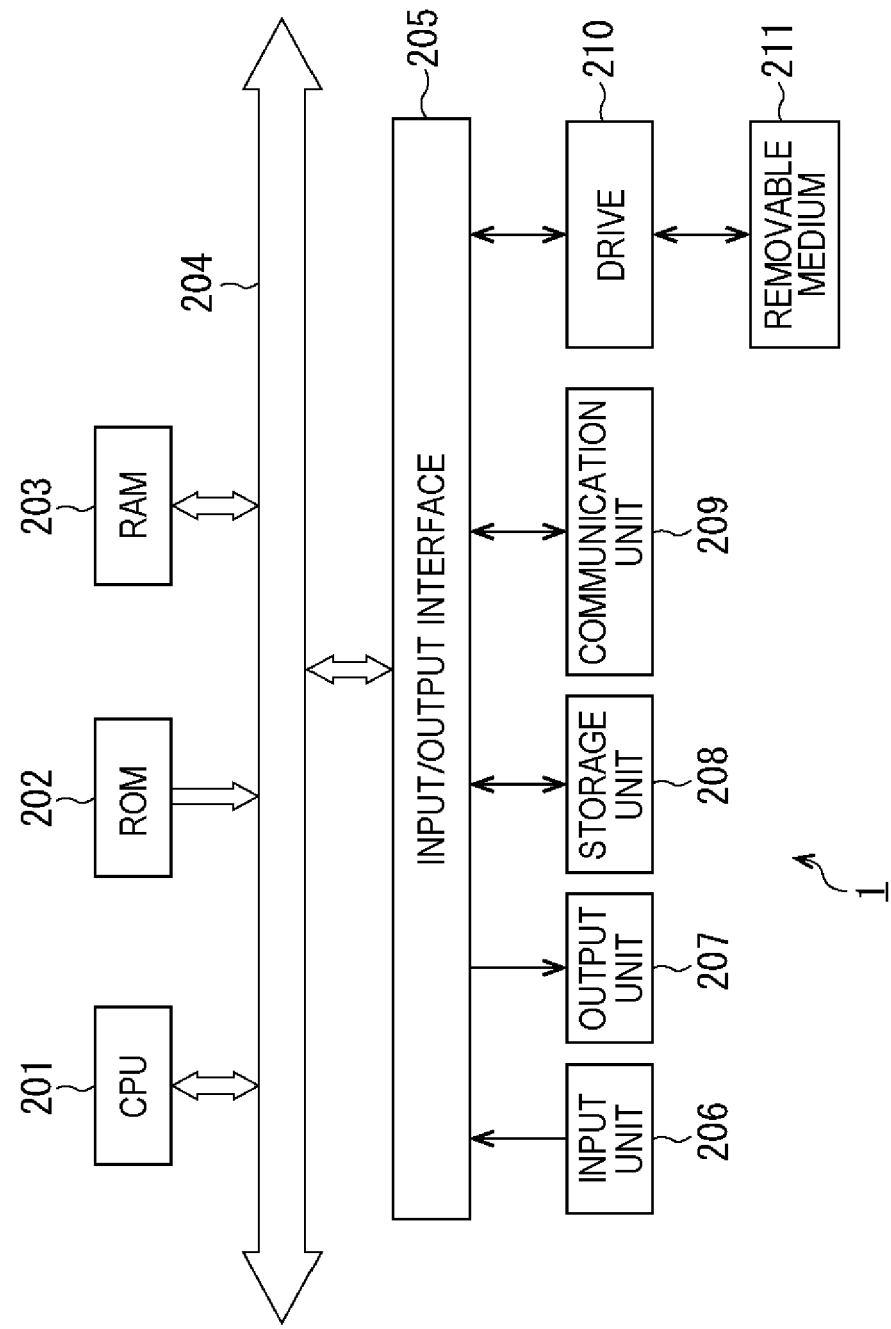
FIG. 25 is a block diagram illustrating a configuration example of hardware of the data processing device.

FIG. 25 is a block diagram illustrating a configuration example of hardware of the data processing device 1.

As illustrated in FIG. 25, the data processing device 1 is configured by a computer. A central processing unit (CPU) 201, a read only memory (ROM) 202, and a random access memory (RAM) 203 are mutually connected by a bus 204.

Moreover, an input/output interface 205 is connected to the bus 204. An input unit 206 including a keyboard, a mouse, and the like, and an output unit 207 including a display, a speaker, and the like are connected to the input/output interface 205.

Furthermore, a storage unit 208 including a hard disk, a nonvolatile memory, and the like, a communication unit 209 including a network interface and the like, and a drive 210 for driving a removable medium 211 are connected to the input/output interface 205.

In the computer configured as described above, the CPU 201 loads, for example, a program stored in the storage unit 208 into the RAM 203 via the input/output interface 205 and the bus 204 and executes the program, thereby performing series of processing.

Figure 26:
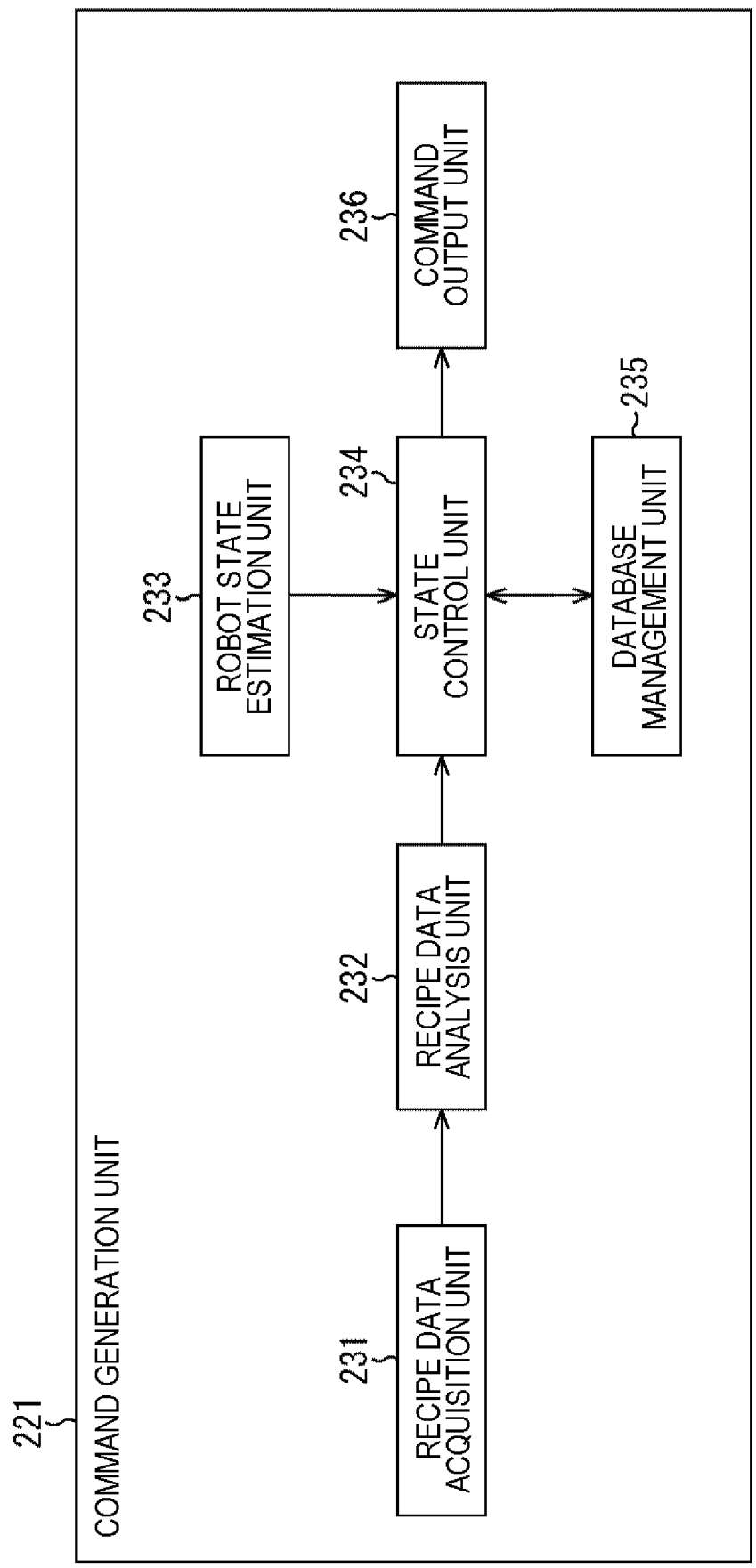
FIG. 26 is a block diagram illustrating a functional configuration example of the data processing device.

FIG. 26 is a block diagram illustrating a functional configuration example of the data processing device 1.

At least a part of functional units illustrated in FIG. 26 is realized by the CPU 201 in FIG. 25 executing a predetermined program.

As illustrated in FIG. 26, in the data processing device 1, a command generation unit 221 is realized. The command generation unit 221 includes a recipe data acquisition unit 231, a recipe data analysis unit 232, a robot state estimation unit 233, a state control unit 234, a database management unit 235, and a command output unit 236.

The recipe data acquisition unit 231 controls the communication unit 209 to acquire recipe data by communicating with a server that manages the recipe data. The recipe data acquired by the recipe data acquisition unit 231 is, for example, recipe data of a dish selected by the user.

A database of the recipe data may be provided in the storage unit 208. In this case, the recipe data is acquired from the database provided in the storage unit 208. The recipe data acquired by the recipe data acquisition unit 231 is supplied to the recipe data analysis unit 232.

The recipe data analysis unit 232 analyzes the image and text data included in the recipe data acquired by the recipe data acquisition unit 231. The analysis result by the recipe data analysis unit 232 is supplied to the state control unit 234.

The robot state estimation unit 233 controls the communication unit 209 to receive an image and sensor data transmitted from the cooking robot 2. From the cooking robot 2, the image captured by the camera of the cooking robot 2 and the sensor data measured by a sensor provided at a predetermined position of the cooking robot 2 are transmitted at a predetermined cycle. A situation around the cooking robot 2 is captured in the image captured by the camera of the cooking robot 2.

The robot state estimation unit 233 estimates a state around the cooking robot 2 such as the state of the cooking arms 21 and the state of the ingredients by analyzing the image and the sensor data transmitted from the cooking robot 2. Information indicating the state around the cooking robot 2 estimated by the robot state estimation unit 233 is supplied to the state control unit 234.

The state control unit 234 sets the goal state on the basis of the analysis result of the recipe data by the recipe data analysis unit 232. The state control unit 234 performs planning of the entire cooking sequence from the current state to the goal state, using the state estimated by the robot state estimation unit 233 as the current state, on the basis of the analysis result of the recipe data.

Furthermore, the state control unit 234 refers to the cooking method DB 102 (state transition DB 111) managed by the database management unit 235, and sets an individual sequence as a state sequence for connecting states configuring the entire cooking sequence.

The state control unit 234 selects an action according to the state before transition and the state after transition by reference to the cooking method DB 102. The state control unit 234 reads out the robot operation specification information regarding the selected action from the action DB 112, and generates an instruction command.

The instruction command generated by the state control unit 234 is a command for causing the cooking robot 2 to execute an action according to the state before transition and the state after transition according to the specification indicated by the robot operation specification information. Thus, the state control unit 234 has a function to generate the instruction command. The instruction command generated by the state control unit 234 is supplied to the command output unit 236.

Note that the instruction command generated by the state control unit 234 may be a command for giving an instruction of execution of an entire action for causing a certain state transition or may be a command for giving an instruction of execution of a part of an action. In other words, one action may be executed according to one instruction command or may be executed according to a plurality of instruction commands.

The database management unit 235 manages the ingredient DB 101, the cooking method DB 102, and the serving method DB 103. The ingredient DB 101, the cooking method DB 102, and the serving method DB 103 are constructed in, for example, the storage unit 208. The command output unit 236 controls the communication unit 209 to transmit the instruction command generated by the state control unit 234 to the cooking robot 2.

Configuration of Cooking Robot 2

Figure 27:
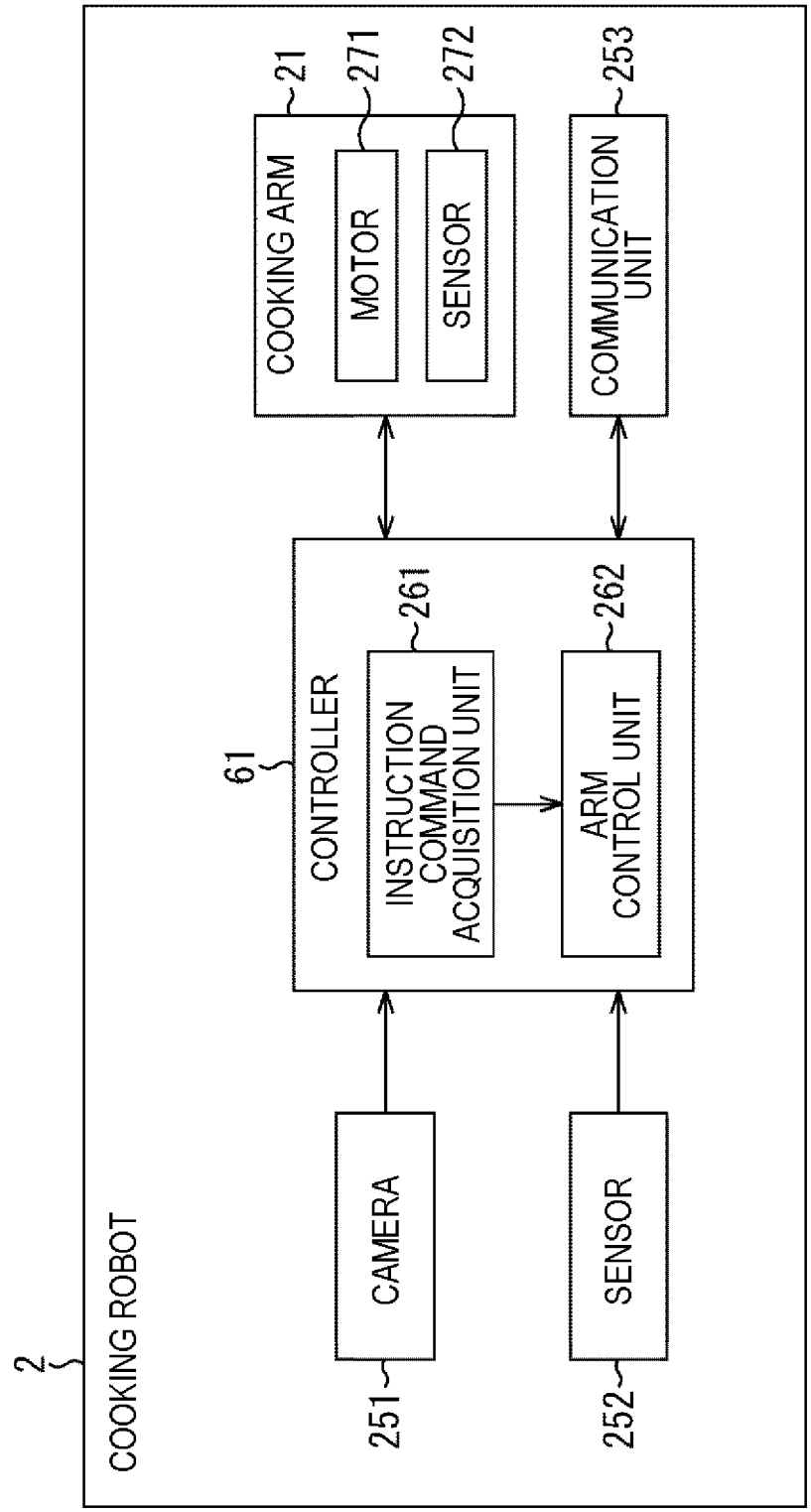
FIG. 27 is a block diagram illustrating a configuration example of the cooking robot.

FIG. 27 is a block diagram illustrating a configuration example of the cooking robot 2.

The cooking robot 2 is configured by connecting each part to the controller 61 (FIG. 7) as a control device that controls the operation of the cooking robot 2. The same configuration, of the configuration illustrated in FIG. 27, as the above-described configuration is denoted by the same sign. Overlapping description will be omitted as appropriate.

A camera 251, a sensor 252, and a communication unit 253 are connected, in addition to the cooking arms 21, to the controller 61.

The controller 61 is configured by a computer having a CPU, a ROM, a RAM, a flash memory, and the like. The controller 61 executes a predetermined program by the CPU to control an overall operation of the cooking robot 2. As described above, the data processing device 1 may be configured by the controller 61.

For example, the controller 61 controls the communication unit 253 to transmit the image captured by the camera 251 and the sensor data measured by the sensor 252 to the data processing device 1.

In the controller 61, a predetermined program is executed to implement an instruction command acquisition unit 261 and an arm control unit 262.

The instruction command acquisition unit 261 acquires an instruction command transmitted from the data processing device 1 and received by the communication unit 253. The instruction command acquired by the instruction command acquisition unit 261 is supplied to the arm control unit 262.

The arm control unit 262 controls the operation of the cooking arms 21 in accordance with the instruction command acquired by the instruction command acquisition unit 261.

The camera 251 captures an image of a situation around the cooking robot 2 and outputs an image obtained by the capture to the controller 61. The camera 251 is provided at various positions such as a front of the cooking assistance system 12 and a distal end of the cooking arm 21.

The sensor 252 is configured by various sensors such as a temperature and humidity sensor, a pressure sensor, an optical sensor, a distance sensor, a motion sensor, a positioning sensor, and a vibration sensor. Measurement by the sensor 252 is performed at a predetermined cycle. The sensor data indicating the measurement result by the sensor 252 is supplied to the controller 61.

The camera 251 and the sensor 252 may be provided at positions distant from the housing 11 of the cooking robot 2.

The communication unit 253 is a wireless communication module such as a wireless LAN module or a portable communication module compatible with long term evolution (LTE). The communication unit 253 communicates with the data processing device 1 or an external device such as a server on the Internet.

Furthermore, the communication unit 253 communicates with a portable terminal such as a smartphone or a tablet terminal used by the user. A user's operation on the cooking robot 2 such as selection of a dish may be input by an operation on the portable terminal.

As illustrated in FIG. 27, the cooking arm 21 is provided with a motor 271 and a sensor 272.

The motor 271 is provided at each joint portion of the cooking arm 21. The motor 271 performs a rotation operation around the axis under the control of the arm control unit 262. An encoder for measuring the amount of rotation of the motor 271, a driver for adaptively controlling the rotation of the motor 271 on the basis of the measurement result by the encoder, and the like are also provided at each joint portion.

The sensor 272 is configured by, for example, a gyro sensor, an acceleration sensor, a touch sensor, or the like. The sensor 272 measures angular velocity, acceleration, and the like of each joint portion during the operation of the cooking arm 21 and outputs information indicating the measurement result to the controller 61. The sensor data indicating the measurement result of the sensor 272 is also transmitted from the cooking robot 2 to the data processing device 1 as appropriate.

Information regarding the specification regarding the ability of the cooking robot 2 such as the number of cooking arms 21 is provided from the cooking robot 2 to the data processing device 1 at predetermined timing. In the data processing device 1, the above-described planning is performed by referring to the information in the database according to the specification regarding the ability of the cooking robot 2. The instruction command generated in the data processing device 1 also corresponds to the specification regarding the ability of the cooking robot 2.

<Operations of Devices>

Here, the operations of the data processing device 1 and the cooking robot 2 having the above-described configuration will be described.

Operation of Data Processing Device 1

First, processing of the data processing device 1 for controlling the operation of the cooking robot 2 will be described with reference to flowcharts in FIGS. 28 and 29.

Figure 28:
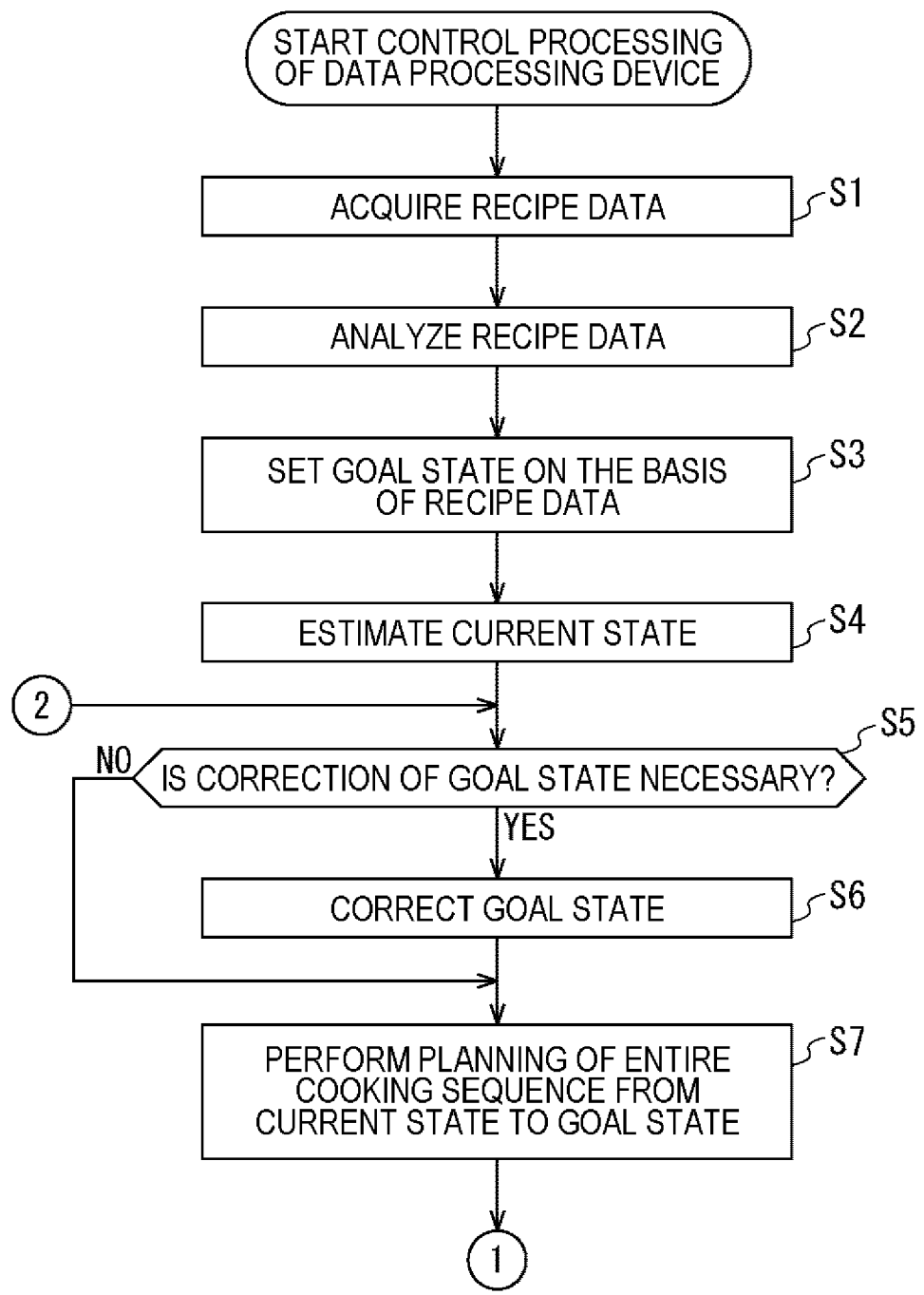
FIG. 28 is a flowchart for describing processing of controlling the data processing device.
Figure 29:
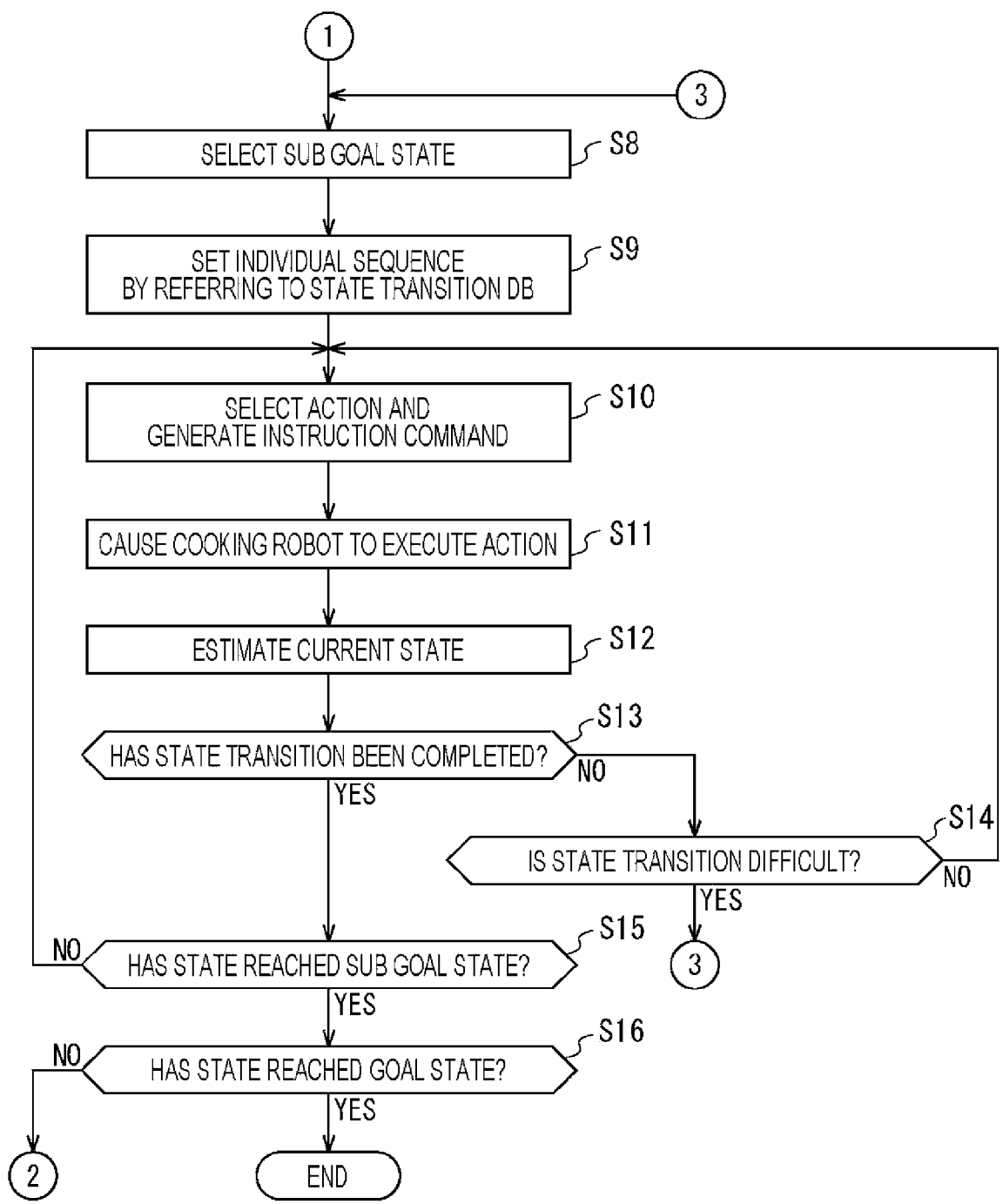
FIG. 29 is a flowchart following FIG. 28, for describing the processing of controlling the data processing device.

The processing in FIGS. 28 and 29 is started when, for example, the user selects cooking a predetermined dish.

In step S1, the recipe data acquisition unit 231 acquires the recipe data.

In step S2, the recipe data analysis unit 232 analyzes the recipe data acquired by the recipe data acquisition unit 231.

In step S3, the state control unit 234 sets the state of the dish appearing in the dish image included in the recipe data as the goal state on the basis of the analysis result by the recipe data analysis unit 232. The goal state is represented by, for example, an ID and a parameter set as described above.

In step S4, the robot state estimation unit 233 estimates the current state on the basis of the image and sensor data transmitted from the cooking robot 2.

In step S5, the state control unit 234 determines whether or not correction of the goal state is necessary.

In a case where the state control unit 234 determines that the correction of the goal state is necessary in step S5, the state control unit 234 corrects the goal state in step S6.

For example, in a case where "tomato" is not around the cooking robot 2 although "tomato" is used as an ingredient for "Nice-style salad" set as the goal state, it is determined that correction of the goal state is necessary. The absence of "tomato" around the cooking robot 2 is specified by the estimation result of the current state by the robot state estimation unit 233.

In this case, the state control unit 234 corrects the goal state by, for example, deleting the parameters regarding "tomato" from the parameter set. In the case where an unreachable state is set as the goal state, such as the state of ingredients usable for cooking not satisfying the state of ingredients set as the goal state, the goal state is corrected to be a reachable state. The goal state may be corrected to change the cooking method instead of correcting the goal state to change the ingredient. Furthermore, the goal state may be corrected to change both the ingredient and the cooking method.

In a case where the state of the ingredients usable for cooking does not satisfy the goal state, a dish that can be cooked with the ingredients usable for cooking may be newly selected and processing for cooking the different dish may be continued.

In a case where it is determined that correction of the goal state is not necessary in step S5, the processing in step S6 is skipped.

In step S7, the state control unit 234 performs planning of the entire cooking sequence from the current state to the goal state on the basis of the analysis result of the recipe data.

In step S8 in FIG. 29, the state control unit 234 selects a sub goal state. For example, among the states configuring the entire cooking sequence, the next state is selected as the sub goal state with reference to the current state.

In step S9, the state control unit 234 refers to the state transition DB 111 managed by the database management unit 235, and sets an individual sequence for connecting the current state and the sub goal state.

As described with reference to FIG. 19, the state transition DB 111 stores the information regarding the state transitions when each ingredient is cooked by various methods. For example, an individual sequence is set by combining the state transitions indicated by the information stored in the state transition DB 111.

The information stored in the action DB 112 may be referred to when setting an individual sequence.

For example, it is assumed that "state transition T" connecting a state s before transition and a state s' after transition is not found. In this case, the state control unit 234 sets a state set $S^S$ of a transition source and a state set $S^D$ of a transition destination. The state set $S^S$ includes the state s, and the state set $S^D$ includes the state s'.

The state control unit 234 searches for all actions with a state $s_i$ included in the state set $S^S$ as the transition source from the actions having information stored in the action DB 112. The state control unit 234 applies the actions found by the search to the state $s_i$ (virtually causes state transitions in a forward direction), and adds the state of the transition destination to the state set $S^S$.

In a case where there is a same state as the state added to the state set $S^S$, in the states included in the state set $S^D$, the state control unit 234 selects the state transition connecting the state si and the state added to the state set $S^s$ as the "state transition T".

Furthermore, in a case where there is not the same state as the state added to the state set $S^S$, in the states included in the state set $S^D$, the state control unit 234 searches for all of actions having a state $s_j$ included in the state set $S^D$ as the transition destination, from the actions having information stored in the action DB 112. The state control unit 234 applies the actions found by the search to the state $s_j$ (virtually causes state transitions in a reverse direction), and adds the state of the transition destination to the state set $S^D$.

In a case where there is a same state as the state added to the state set $S^D$, in the states included in the state set $S^S$, the state control unit 234 selects the state transition connecting the state $s_j$ and the state added to the state set $S^D$ as the "state transition T".

In step S10, the state control unit 234 refers to the cooking method DB 102, selects an action for causing the state transition from the current state to the next state, and generates the instruction command. Details of selection of an action will be described below.

In step S11, the command output unit 236 transmits the instruction command to the cooking robot 2, and causes the cooking robot 2 to execute the action selected by the state control unit 234.

In step S12, the robot state estimation unit 233 estimates the current state on the basis of the image and sensor data transmitted from the cooking robot 2.

In step S13, the state control unit 234 determines whether or not the state transition to the next state has been completed on the basis of the current state estimated by the robot state estimation unit 233.

In a case where the state control unit 234 determines that the state transition has not been completed in step S13, the state control unit 234 determines whether or not the state transition is in a difficult state in step S14.

In a case where the state control unit 234 determines that the state transition is not in a difficult state in step S14, the processing returns to step S10 and the subsequent processing is repeated.

On the other hand, in a case where the state control unit 234 determines that the state transition is in a difficult state in step S14, the processing returns to step S8 and a sub goal state is newly selected.

For example, it is assumed that an ingredient to be cut falling from the top plate 11A as a result of execution of the action of cutting and the cutting of the ingredient becoming not possible is estimated by the robot state estimation unit 233. In this case, it is determined that the state transition is in a difficult state, and thereafter, a state in which the ingredient to be cut is not used is selected as a new sub goal state.

In a case where the state control unit 234 determines that the state transition to the next state has been completed in step S13, the state control unit 234 determines whether or not the state has transitioned to the sub goal state in step S15.

In a case where it is determined that the state has not been transitioned to the sub goal state in step S15, the processing returns to step S10 and the above processing is repeated to perform the state transition according to the individual sequence.

In a case where the state control unit 234 determines that the state has reached the sub goal state in step S15, the state control unit 234 determines whether or not the state has reached the goal state in step S16.

In a case where it is determined that the state transition has not reached the goal state in step S16, the processing returns to step S5 and the subsequent processing is repeated. In other words, whether or not correction of the goal state is necessary is determined each time the state reaches one sub goal state, and the goal state is corrected as appropriate and the processing proceeds.

The respective states up to the goal state, which configure the entire cooking sequence, may be corrected in conjunction with the correction of the goal state.

In a case where it is determined that the state has reached the goal state in step S16, the processing ends. At this time, the current state is the state where the dish set as the goal state is completed.

As described above, the control of the cooking robot 2 proceeds while autonomously correcting (changing) the goal state each time the state transition occurs. Since the correction is performed to set the reachable state as the goal state, the processing is not terminated while the dish is incomplete.

As a method of controlling a robot, for example, there is a method of giving up reaching the goal state and terminating the processing when the state becomes an unreachable state to the set goal state.

If the processing is terminated in response to the state of the cooking robot 2 becoming an unreachable state to the goal state, the ingredients used so far become wasted.

By advancing the processing while correcting the goal state as appropriate and controlling the cooking robot 2 to surely reach the goal state, occurrence of waste of ingredients can be prevented.

Selection of Action

Figure 30:
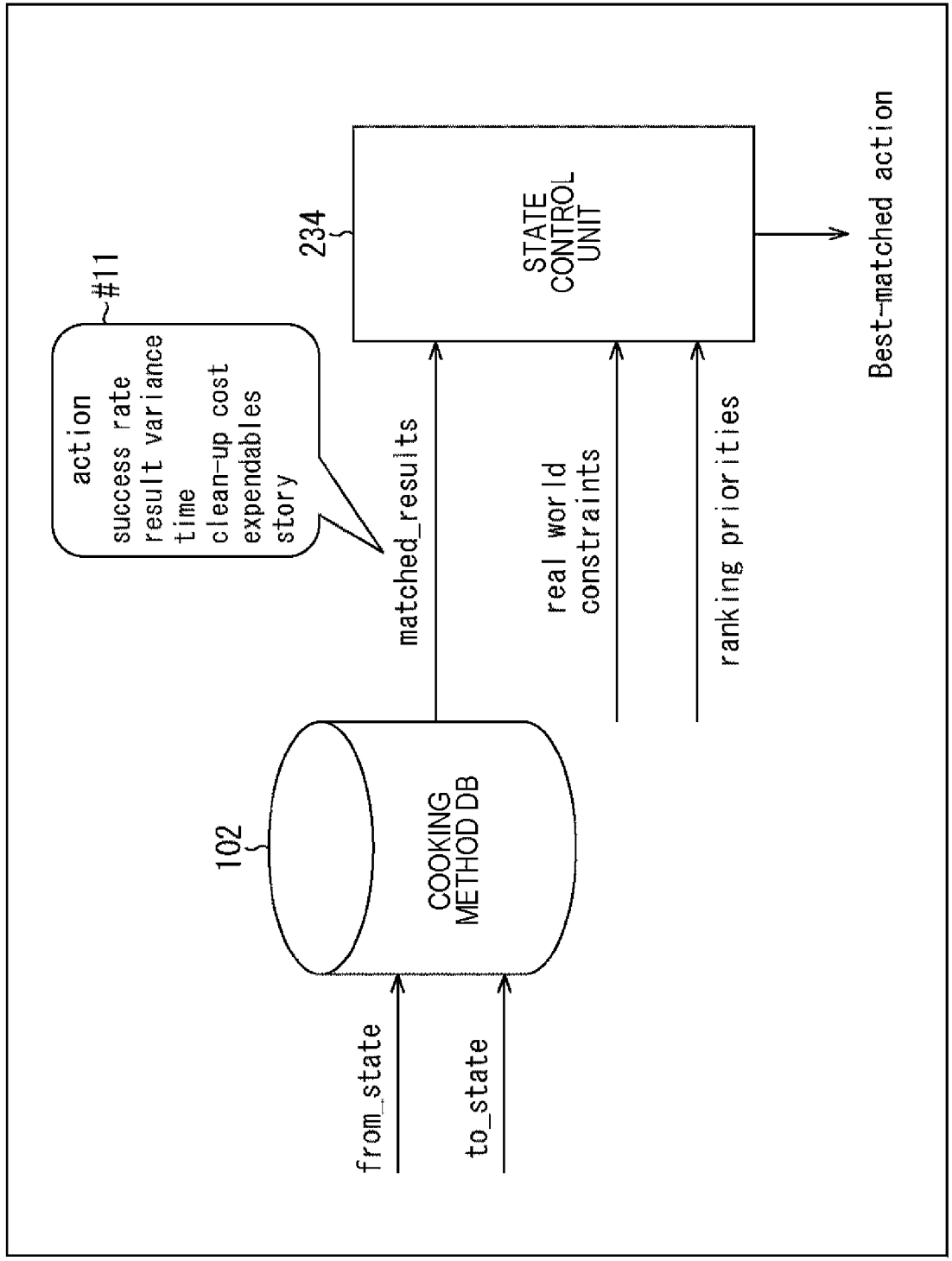
FIG. 30 is a diagram illustrating an example of selection of an action.

FIG. 30 is a diagram illustrating an example of selection of an action to be performed in step S10 in FIG. 29.

The selection of an action to be executed by the cooking robot 2 is performed by reference to the cooking method DB 102. As described above, in the cooking method DB 102 managed by the database management unit 235, the state transition constituting the individual sequence and the specification of the action are managed in association with each other.

As illustrated in the left end in FIG. 30, the state control unit 234 searches the cooking method DB 102 using a pair of an ID of the state before transition and an ID of the state after transition (<from_state_id, to_state_id>) as a key. By performing the search, an action managed in association with the paired IDs as a key is acquired as an action candidate.

For example, an action candidate corresponding to the pair of IDs in which the current state is the state before transition and the next state of the current state in the individual sequence is the state after transition is acquired. An action candidate may also be acquired on the basis of a parameter set indicating a state.

In a case where a plurality of action candidates is acquired, the state control unit 234 evaluates state transitions in a case where the actions according to the respective action candidates are performed. An evaluator used to evaluate the state transition is prepared in a form linked to each action candidate.

As illustrated in a balloon #11, the evaluation result of the action candidate is expressed by a success rate, a variance value, a time taken to execute the action, a load applied to cleaning up after the execution of the action, and the like.

The state control unit 234 selects, for example, an action candidate causing the state transition with the best evaluation result as the action to be executed by the cooking robot 2. For example, an action candidate with a high success rate has a higher evaluation result than an action candidate with a low success rate. For the evaluation of the state transition, constraints, priorities, or the like according to the current state are also used as appropriate.

FIG. 31 is a diagram illustrating an example of selection of action candidates.

As illustrated in FIG. 31, in a case where the state before transition is "whole tomato" and the state after transition is "⅛ tomato wedge", an action candidate of "cut by a knife" is acquired by a search with the pair of IDs of the aforementioned states as a key.

As other action candidates, "cut by scissors", "cut by a slicer", and "tear by hands" are acquired as illustrated in a balloon #21.

Figure 32:
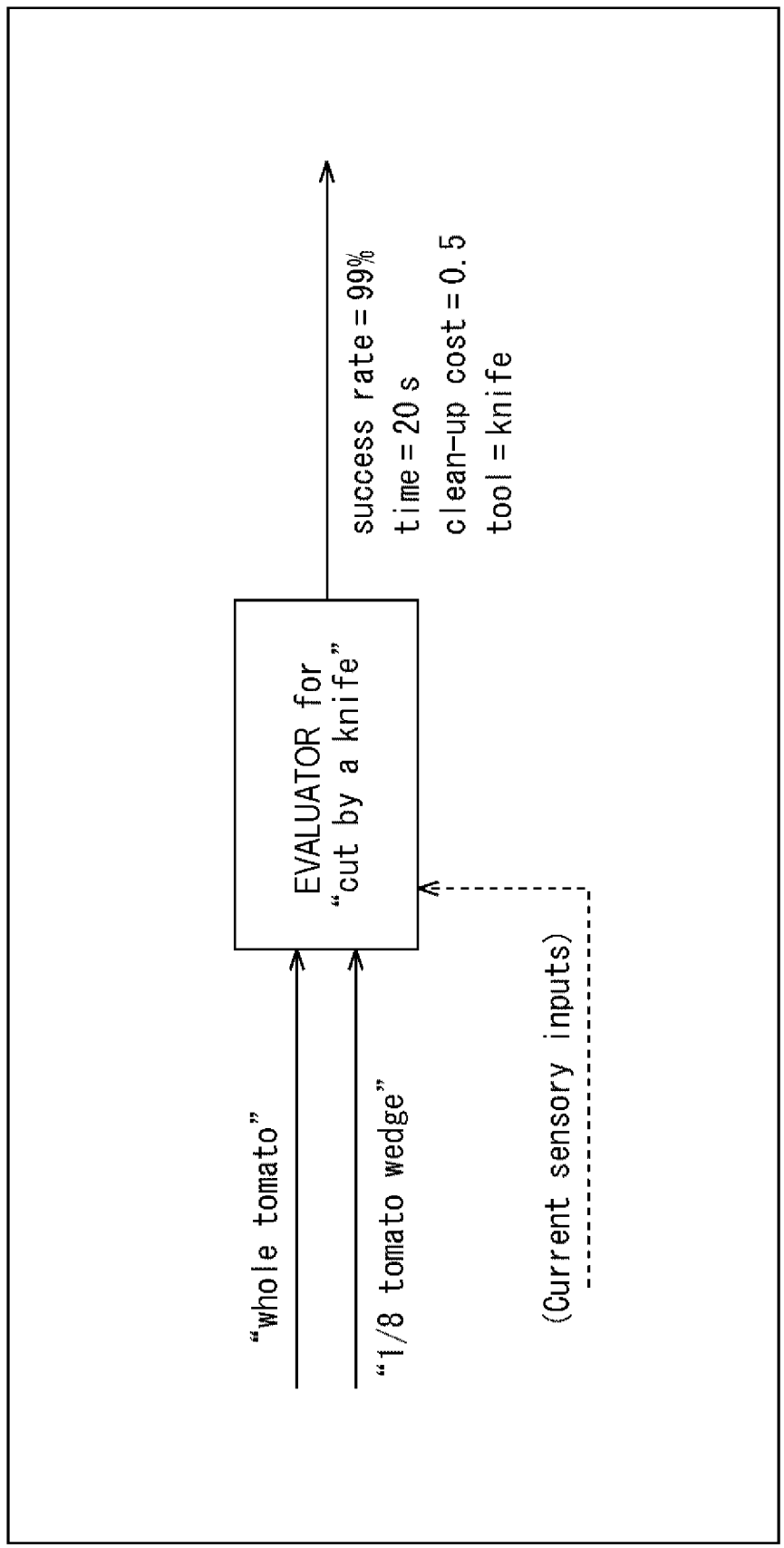
FIG. 32 is a diagram illustrating an example of evaluation of action candidates.

FIG. 32 is a diagram illustrating an example of evaluation of an action candidate.

An evaluation result of the action candidate "cut by a knife" is output as illustrated in FIG. 32 by using an evaluator associated with the action candidate of "cut by a knife". In the example in FIG. 32, the success rate of the action candidate of "cut by a knife" is 99%, and the time taken to execute the action is 20 seconds. Furthermore, the load applied to cleaning up after the execution of the action is 0.5.

Each element constituting the evaluation result may be weighted to evaluate the action candidate.

In step S10 in FIG. 29, one action is selected on the basis of such an evaluation, for example.

Generation of Instruction Command

The instruction command has been generated on the basis of the information stored in the action DB 112 after the action to be executed by the cooking robot 2 is selected. However, the instruction command may be generated using a neural network (NN).

Figure 33:
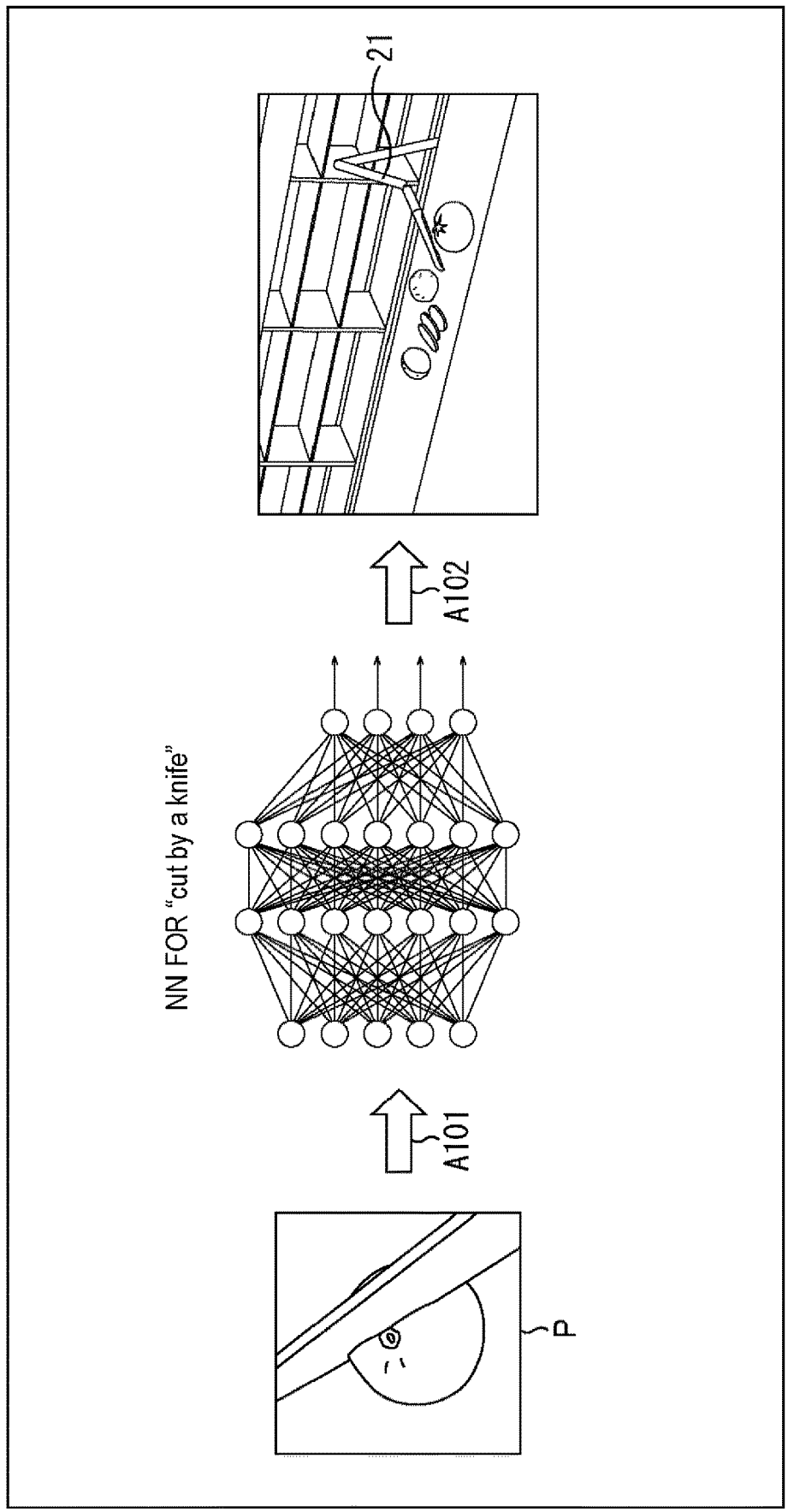
FIG. 33 is a diagram illustrating an example of generation of an instruction command.

FIG. 33 is a diagram illustrating an example of generation of an instruction command.

As illustrated in FIG. 33, an NN used to generate the instruction command is prepared for each action. The NN used to generate the instruction command is, for example, an NN that outputs the instruction command, with the parameter set indicating the state before transition and the state after transition, the information indicating the current state, and the like, as inputs.

The current state is expressed by, for example, vector data obtained by converting the image captured by the cooking robot 2, vector data obtained by converting the sensor data measured by the cooking robot 2, or the like. The NN for each action is generated in advance by learning using various learning data such as time series of vector data, and is managed by, for example, the database management unit 235.

The NN in FIG. 33 is an NN for the action of "cut by a knife". In a case where the action of "cut by a knife" is selected, an image P captured by the cooking robot 2 is input together with other information to the NN for the action of "cut by a knife", as illustrated by an arrow A101, in a case where the action of "cut by a knife" is selected. The image P is an image obtained by capturing an image of a situation in which "knife" is placed against "tomato".

An action for transitioning to the next state is performed, as illustrated by a point of an arrow A102, as a predetermined instruction command output from the NN for the action of "cut by a knife" is transmitted to the cooking robot 2 and is executed.

Operation of Cooking Robot 2

Next, cooking processing of the cooking robot 2 will be described with reference to the flowchart in FIG. 34.

Figure 34:
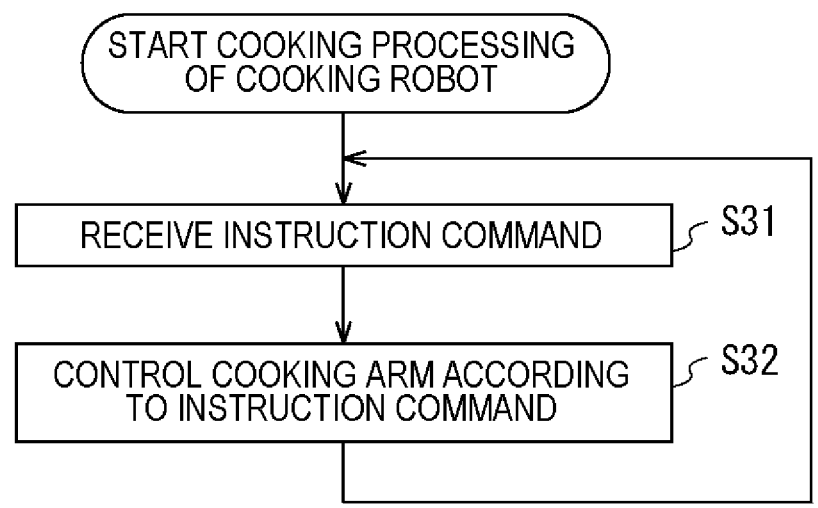
FIG. 34 is a flowchart for describing cooking processing by the cooking robot.

The processing illustrated in FIG. 34 is started when, for example, the communication unit 253 receives the instruction command transmitted from the data processing device 1.

In step S31, the instruction command acquisition unit 261 acquires the instruction command transmitted from the data processing device 1.

In step S32, the arm control unit 262 controls the operation of the cooking arm 21 according to the instruction command. Thereafter, the processing returns to step S31, and the above processing is repeated each time the instruction command is transmitted from the data processing device 1.

The data processing device 1 can estimate the ingredients to be used for a dish, the method of cooking each ingredient, and the method of serving cooked ingredients from the image and text data included in the recipe data by the above-described series of processing.

Since the information regarding cooking methods according to various states of ingredients and the like are prepared in the database, the data processing device 1 can cause the cooking robot 2 to cook in forms corresponding to various states. The information prepared in the database can be said to be information corresponding to the knowledge about cooking possessed by persons.

As described above, images corresponding to visual information of ingredients possessed by persons are prepared in the ingredient DB 101. Furthermore, information corresponding to the knowledge about cooking methods, such as types of cooking and how to proceed with cooking is prepared in the cooking method DB 102. Furthermore, information corresponding to the knowledge about how to serve is prepared in the serving method DB 103.

The data processing device 1 can cause the cooking robot 2 to perform cooking in forms corresponding to various states by supplementing content not expressed in the recipe data with the information corresponding to such knowledge.

Meanwhile, the cooking robot 2 can complete the dish by cooking the ingredients and serving the cooked ingredients on the basis of the estimation result by the data processing device 1. Since the planning of the state transition is repeatedly performed, the cooking robot 2 can complete the dish regardless of the state.

As described above, the control system illustrated in FIG. 1 implements causing the cooking robot 2 to perform cooking on the basis of the recipe data, which includes images and text data and can be incomplete information for controlling robots.

«Modification»

Although the planning of cooking has been performed on the basis of the recipe data and the information prepared in the database, planning may be performed in consideration of preference of the user. For example, planning is performed by adding a favorite ingredient or excluding a dislike ingredient of the user.

The planning may be performed by changing an ingredient or changing the amount of an ingredient according to restrictions such as the type and the number of ingredients usable for cooking.

Cooking having entertainment properties may be performed. For example, processing of explaining how to cut before cutting an ingredient with voice or reproducing music when a dish is completed is performed by the cooking robot 2, whereby entertainment properties can be given to the cooking of the cooking robot 2.

The case of cooking one dish on the basis of one recipe data has been described. However, a plurality of recipe data may be input to the data processing device 1 and planning of a dish and the like may be performed on the basis of the plurality of recipe data. In a case where a plurality of recipe data is input, the data processing device 1 processes and combines the pieces of recipe data into one recipe data.

Figure 35:
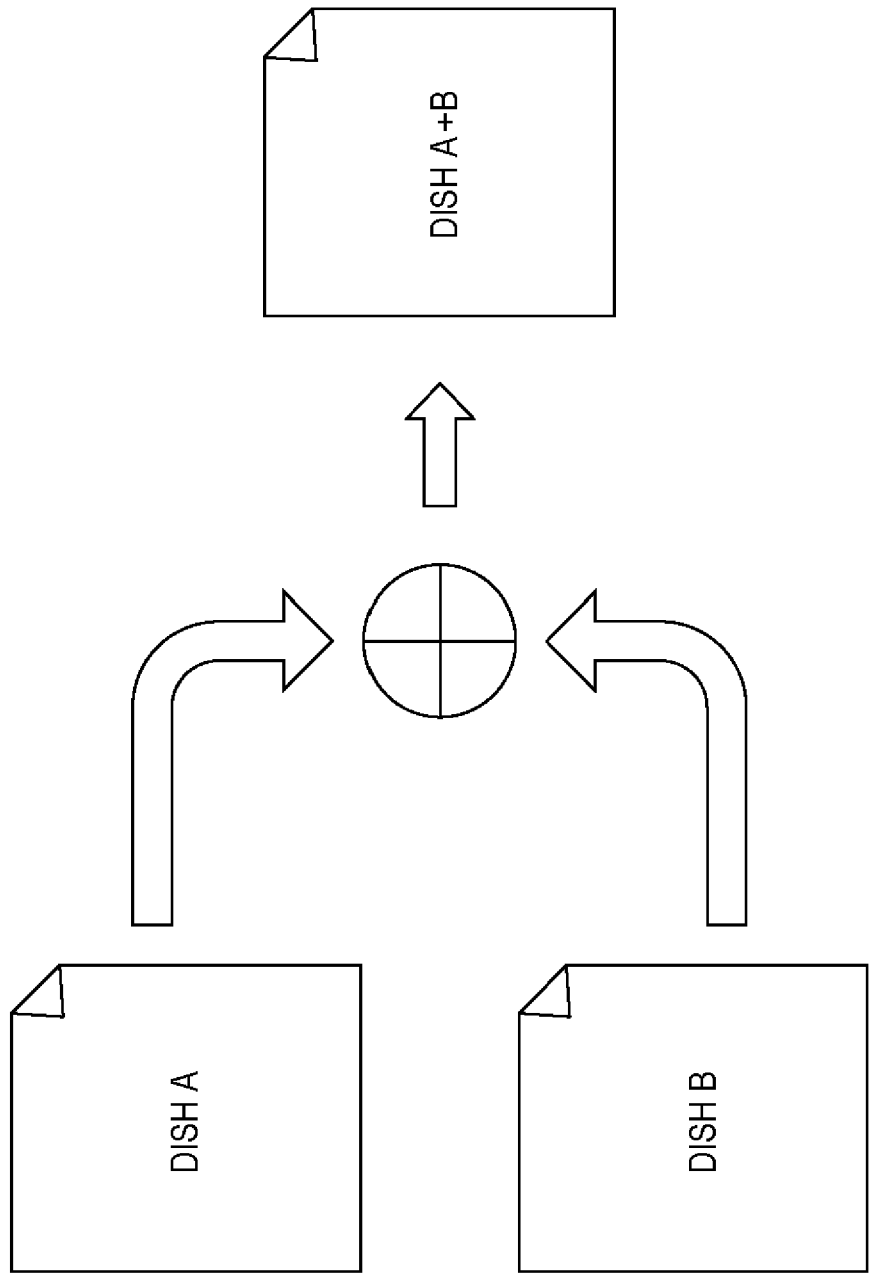
FIG. 35 is a diagram illustrating an example of processing of recipe data.

FIG. 35 is a diagram illustrating an example of processing of the recipe data.

In a case of making a plurality types of dishes, cooking for making the plurality of types of dishes in parallel is carried out, rather than making one type of dish at a time in order.

For example, in a case where making a dish A and a dish B has been selected, the state control unit 234 combines recipe data of the dish A and recipe data of the dish B to generate recipe data for making the dish A and the dish B, as illustrated in FIG. 35.

In the processed recipe data, work for making the dish A and work for making the dish B are combined.

The other work for making the dish B can be performed during the work for making the dish A depending on the number of the cooking arms 21 or the type of the usable attachment.

By changing description content of the recipe data so that works for making the respective dishes can be appropriately performed in parallel in the case of making a plurality of types of dishes, the cooking time can be shortened.

<Configuration Example of Computer>

The series of processing described above can be executed by hardware or software. In a case where the series of processing is executed by software, a program constituting the software is installed from a program recording medium into a computer incorporated in dedicated hardware, a general-purpose personal computer, or the like.

The series of processing described above can be executed by hardware or software. In a case where the series of processing is executed by software, a program constituting the software is installed in a computer incorporated in dedicated hardware, a general-purpose personal computer, or the like.

The program to be installed is recorded on and provided with the removable medium 211 illustrated in FIG. 25, which includes an optical disk (a compact disc-read only memory (CD-ROM), a digital versatile disc (DVD), or the like), a semiconductor memory, or the like. Further, the program may be provided via a wired or wireless transmission medium such as a local area network, the Internet, or digital broadcast. The program can be installed in the ROM 202 or the storage unit 208 in advance.

The program executed by the computer may be a program processed in chronological order according to the order described in the present specification or may be a program executed in parallel or at necessary timing such as when a call is made.

Note that, in this specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one casing are both systems.

The effects described in this specification are merely examples and are not limited, and other effects may be exhibited.

Embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Furthermore, the steps described in the above-described flowcharts can be executed by one device or can be shared and executed by a plurality of devices.

Moreover, in the case where a plurality of processes is included in one step, the plurality of processes included in the one step can be executed by one device or can be shared and executed by a plurality of devices.

It should be understood by those skilled in the art that various modifications, combinations, sub-combinations and alterations may occur depending on design requirements and other factors insofar as they are within the scope of the appended claims or the equivalents thereof.

It should be noted that the present technology may adopt the following configurations.

(1) A data processing device including:

a command generation unit configured to generate an instruction command for giving an instruction of one or more operations to be executed during a process by a robot provided with at least one arm, wherein the instruction command is generated on a basis of instruction data including image data obtained by capturing one or more images of situations during or after the process, and text data indicating at least one of an object to be utilized in the process or an operation to be executed during the process, and wherein the command generation unit is implemented via at least one processor.

(2) The data processing device according to (1), wherein the one or more operations include one or more cooking operations to be executed during a cooking process, the instruction data includes recipe data of a dish, and the at least one object utilized in the process includes at least one ingredient used in the cooking process, and the command generation unit generates the instruction command by reference to a cooking data set including information in which the at least one ingredient and a cooking operation to be executed using the at least one ingredient are associated with each other.

(3) The data processing device according to (1) or (2), wherein the cooking data set is information in which the cooking operation and a cooking tool used when the cooking operation is performed are associated with each other.

(4) The data processing device according to any one of (1) to (3), wherein the cooking data set is information in which the cooking operation, a cooking tool used when the cooking operation is performed, and a specification of the cooking tool are associated with one another. (5) The data processing device according to any one of (1) to (4), wherein the command generation unit generates the instruction command by reference to a specification regarding an ability of the robot and the cooking data set. (6) The data processing device according to any one of (1) to (5), wherein the command generation unit generates the instruction command by reference to a serving data set including information regarding a method of serving the at least one ingredient in the dish.

(7) The data processing device according to any one of (1) to (6), wherein the serving data set is information in which an identifier of the at least one ingredient and position data indicating a position of the at least one ingredient in tableware used for serving are associated with each other.

(8) The data processing device according to any one of (1) to (7), wherein the position data is information indicating at least one of a plane position of the at least one ingredient or a hierarchical position of the at least one ingredient.

(9) The data processing device according to any one of (1) to (8), wherein the position data is information indicating a plane arrangement pattern arranging ingredients in a predetermined pattern in a same hierarchy as the plane position of the at least one ingredient, and indicating a hierarchical arrangement pattern arranging the ingredients in a predetermined pattern in different hierarchies as the hierarchical position of the ingredients.

(10) The data processing device according to any one of (1) to (9), wherein the image data includes data of one or more still images obtained by capturing the situations during or after the process or a moving image obtained by capturing one or more operations executed during the process. (11) The data processing device according to any one of (1) to (10), wherein the instruction data further includes at least one of text data indicating a name of the object or text data indicating the process as the text data.

(12) The data processing device according to any one of (1) to (11), wherein the command generation unit generates the instruction command according to a state transition in which a situation appearing in the image data is set as a goal state.

(13) The data processing device according to any one of (1) to (12), wherein, in a case where a state of the object to be utilized in the process does not satisfy a state of the object described in the instruction data, the command generation unit sets the state transition according to the state of the object to be utilized in the process and generates the instruction command. (14) The data processing device according to any one of (1) to (13), wherein the command generation unit sets the state transition according to a preference of a user, and generates the instruction command.

(15) The data processing device according to any one of (1) to (14), wherein the command generation unit autonomously changes the state transition according to a state of the one or more operations to be executed during the process, and generates the instruction command.

(16) The data processing device according to any one of (1) to (15), wherein the command generation unit sets the state transition in which at least one of the object or the process is changed according to the state of the one or more operations, and generates the instruction command.

(17) The data processing device according to any one of (1) to (16), wherein the command generation unit sets the state transition while referring to a data set including information in which the object to be utilized in the cooking process and an operation to be executed using the object are associated with each other a plurality of times.

(18) The data processing device according to any one of (1) to (17), wherein the command generation unit sets the state transition while referring to a serving data set including information regarding a method of serving the object after it is utilized in the process a plurality of times.

(19) The data processing device according to any one of (1) to (18), wherein the command generation unit generates the instruction command on a basis of combined instruction data obtained by combining a plurality of the instruction data.

(20) A data processing method including:

generating, by a data processing device, an instruction command for giving an instruction of one or more operations to be executed during a process by a robot provided with at least one arm, wherein the instruction command is generated on a basis of instruction data including image data obtained by capturing one or more images of situations during or after the process, and text data indicating at least one of an object to be utilized in the process or an operation executed during the process.

REFERENCE SIGNS LIST

1 Data processing device
2 Cooking robot
21-1 to 21-4 Cooking arm
61 Controller
221 Command generation unit
231 Recipe data acquisition unit
232 Recipe data analysis unit
233 Robot state estimation unit
234 State control unit
235 Database management unit
236 Command output unit
251 Camera
252 Sensor
253 Communication unit
261 Instruction command acquisition unit
262 Arm control unit

The invention claimed is:

1. A data processing device comprising:
a command generation unit configured to generate an instruction command for giving an instruction of one or more operations to be executed during a process by a robot provided with at least one arm,
wherein the instruction command is generated on a basis of instruction data including
image data obtained by capturing one or more images of situations during or after a prior execution of the process, and
text data indicating at least one of an object to be utilized in the process by the robot or each operation to be executed during the process by the robot,
wherein the command generation unit generates the instruction command according to a state of an object appearing in the image data set as a goal state,
wherein, when a current state of the object to be utilized in the process by the robot does not satisfy the goal state of the object appearing in the image data, the command generation unit generates the instruction command according to the current state of the object to be utilized in the process by the robot, and
wherein the command generation unit is implemented via at least one processor.

2. The data processing device according to claim 1,
wherein the one or more operations comprise one or more cooking operations to be executed during a cooking process,
wherein the instruction data comprises recipe data of a dish,
wherein the at least one object utilized in the process comprises at least one ingredient used in the cooking process, and wherein the command generation unit generates the instruction command by reference to a cooking data set including stored information in which the at least one ingredient and a cooking operation to be executed using the at least one ingredient are stored in association with each other.

3. The data processing device according to claim 2,
wherein the cooking data set is information in which the cooking operation and a cooking tool used when the cooking operation is performed are associated with each other.

4. The data processing device according to claim 2,
wherein the cooking data set is information in which the cooking operation, a cooking tool used when the cooking operation is performed, and a specification of the cooking tool are associated with one another.

5. The data processing device according to claim 2,
wherein the command generation unit generates the instruction command by reference to a specification regarding an ability of the robot and the cooking data set.

6. The data processing device according to claim 2,
wherein the command generation unit generates the instruction command by reference to a serving data set including information regarding a method of serving the dish.

7. The data processing device according to claim 6,
wherein the serving data set is information in which including
an identifier of the at least one ingredient, and
position data indicating a position of each ingredient of the at least one ingredient in relation to tableware used for serving the dish,
wherein the identifier and the position data are stored in association with each other.

8. The data processing device according to claim 7,
wherein the position data is information indicating at least one of a plane position of the at least one ingredient or a hierarchical position of the at least one ingredient.

9. The data processing device according to claim 8, wherein
the position data is information indicating a plane arrangement pattern arranging ingredients in a predetermined pattern in a same hierarchy as the plane position of the at least one ingredient, and indicating a hierarchical arrangement pattern arranging the ingredients in a predetermined pattern in different hierarchies as the hierarchical position of the ingredients.

10. The data processing device according to claim 1, wherein
the image data comprises data of one or more still images obtained by capturing the situations during or after the process or a moving image obtained by capturing one or more operations executed during the process.

11. The data processing device according to claim 1, wherein
the instruction data further includes at least one of text data indicating a name of the object or text data indicating the process as the text data.

12. The data processing device according to claim 1,
wherein the command generation unit generates the instruction command by setting a state transition to satisfy the goal state from the current state of the object to be utilized in the process, the state transition being set according to a preference of a user.

13. The data processing device according to claim 12, wherein the command generation unit generates the instruction command by autonomously changing the state transition according to a state of the one or more operations to be executed during the process by the robot.

14. The data processing device according to claim 13, wherein the command generation unit generates the instruction command by setting the state transition in which either the object to be utilized in the process by the robot or at least one operation to be executed during the process by the robot is changed according to the state of the one or more operations.

15. The data processing device according to claim 12, wherein the command generation unit sets the state transition while referring to a data set including information in which the object to be utilized in the cooking process by the robot and each operation to be executed using the object are stored in association with each other a plurality of times.

16. The data processing device according to claim 12, wherein the command generation unit sets the state transition while referring to a serving data set including information regarding a method of serving the object after the object is utilized in the process by the robot a plurality of times.

17. The data processing device according to claim 1, wherein the command generation unit generates the instruction command on a basis of combined instruction data obtained by combining a plurality of the instruction data.

18. A data processing method comprising:

generating, by a data processing device, an instruction command for giving an instruction of one or more operations to be executed during a process by a robot provided with at least one arm, wherein the instruction command is generated on a basis of instruction data including image data obtained by capturing one or more images of situations during or after a prior execution of the process, and text data indicating at least one of an object to be utilized in the process by the robot or each operation executed during the process, wherein the instruction command is generated according to a state of an object appearing in the image data set as a goal state, and wherein, when a current state of the object to be utilized in the process by the robot does not satisfy the goal state of the object appearing in the image data, the instruction command is generated according to the current state of the object to be utilized in the process by the robot.

* * * * *